(12) United States Patent
Dai et al.

(10) Patent No.: US 12,471,097 B2
(45) Date of Patent: Nov. 11, 2025

(54) MULTI-LEVEL TIME-DOMAIN SCALABLE UPLINK CHANNEL RESOURCES

(71) Applicant: QUALCOMM Incorporated, San Diego, CA (US)

(72) Inventors: Jing Dai, Beijing (CN); Chao Wei, Beijing (CN); Gokul Sridharan, Sunnyvale, CA (US); Hung Dinh Ly, San Diego, CA (US); Qiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 18/254,360

(22) PCT Filed: Jan. 22, 2021

(86) PCT No.: PCT/CN2021/073193
§ 371 (c)(1),
(2) Date: May 24, 2023

(87) PCT Pub. No.: WO2022/155873
PCT Pub. Date: Jul. 28, 2022

(65) Prior Publication Data
US 2024/0032041 A1 Jan. 25, 2024

(51) Int. Cl.
*H04W 72/21* (2023.01)
*H04W 72/0446* (2023.01)

(52) U.S. Cl.
CPC ....... *H04W 72/21* (2023.01); *H04W 72/0446* (2013.01)

(58) Field of Classification Search
CPC .......... H04W 72/21; H04W 72/0446; H04L 1/1671; H04L 1/1861; H04L 1/1858

(Continued)

(56) References Cited

U.S. PATENT DOCUMENTS 10,819,410 B2   10/2020   Akkarakaran et al.
2017/0181194 A1*  6/2017   Huang ................. H04W 72/20
(Continued)

FOREIGN PATENT DOCUMENTS

CN    110431775        11/2019
CN    111149398 A       5/2020
(Continued)

OTHER PUBLICATIONS

International Search Report and Written Opinion—PCT/CN2021/073193—ISA/EPO—Oct. 29, 2021.
(Continued)

*Primary Examiner* — Obaidul Huq
(74) *Attorney, Agent, or Firm* — Paul M. McAdams; Holland & Hart LLP

(57) ABSTRACT

Methods, systems, and devices for wireless communications are described. A user equipment (UE) may adjust resources (e.g., time resources, frequency resources) used to transmit repetitions of uplink control information (UCI) over a physical uplink control channel (PUCCH). The UE may adjust two parameters corresponding to different scales (e.g., levels) of adjustment, where a first parameter corresponds to a number of repetitions of a PUCCH resource and a second parameter corresponds to a number of slots within each PUCCH repetition. The UE may adjust the resources based on the first parameter, the second parameter, a size of UCI, a maximum coding rate, or some combination thereof, such that the PUCCH resources carrying UCI satisfy the maximum code rate and UCI size.

30 Claims, 20 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0318575 A1* | 11/2017 | Park | ...................... H04L 1/1664 |
| 2018/0279298 A1 | 9/2018 | Wang et al. | |
| 2019/0313342 A1* | 10/2019 | Papasakellariou | .. H04W 52/325 |
| 2020/0259625 A1 | 8/2020 | Papasakellariou | |
| 2021/0099982 A1 | 4/2021 | Xu et al. | |
| 2023/0318748 A1* | 10/2023 | Yin | ...................... H04L 1/1854 |
| | | | 370/329 |

FOREIGN PATENT DOCUMENTS

| | | |
|---|---|---|
| CN | 111919488 | 11/2020 |
| CN | 111937440 | 11/2020 |
| CN | 111955025 A | 11/2020 |
| WO | WO-2018127201 A1 | 7/2018 |
| WO | WO-2018175967 | 9/2018 |
| WO | WO-2019195160 | 10/2019 |

OTHER PUBLICATIONS

Supplementary European Search Report—EP21920272—Search Authority—The Hague—Sep. 23, 2024.

* cited by examiner

MULTI-LEVEL TIME-DOMAIN SCALABLE UPLINK CHANNEL RESOURCES

CROSS REFERENCE

The present application is a 371 national stage filing of International PCT Application No. PCT/CN2021/073193 by DAI et al. entitled "MULTI-LEVEL TIME-DOMAIN SCALABLE UPLINK CHANNEL RESOURCES," filed Jan. 22, 2021, which is assigned to the assignee hereof, and which is expressly incorporated by reference in its entirety herein.

FIELD OF TECHNOLOGY

The following relates to wireless communications, including multi-level time-domain scalable uplink channel resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device may repeat messages to provide coverage enhancement. For example, a UE may transmit a message over a channel with a number of repetitions. Enhancements to resource allocation schemes for such repetitions may be desirable.

SUMMARY

The described techniques relate to improved methods, systems, devices, and apparatuses that support multi-level time-domain scalable uplink channel resources. Generally, the described techniques provide for adjusting resources (e.g., time resources, frequency resources) used to transmit repetitions of uplink control information (UCI) over a physical uplink control channel (PUCCH). A user equipment (UE) may adjust a number of repetitions and/or a number of time intervals (e.g., slots) within each repetition. More specifically, the described techniques provide for parameters corresponding to different scales (e.g., levels) of adjustment of a set of configured resources, where a first parameter corresponds to a number of repetitions of a PUCCH transmission and a second parameter corresponds to a number of slots within each repetition of the PUCCH transmission. The UE may adjust the resources by modifying the first parameter, the second parameter, or both. The parameters, and the resources used for the repetitions of the PUCCH transmission, may be adjusted based on a size of UCI, a coding rate (e.g., a maximum coding rate), or some combination thereof, such that the PUCCH resources carrying UCI satisfy the maximum code rate and UCI size.

A method for wireless communication at a UE is described. The method may include identifying a set of resources for transmitting one or more repetitions of UCI over an uplink control channel, adjusting the set of resources in a time domain based on a payload size of the UCI and a coding rate, where adjusting the set of resources includes modifying a number of repetitions of the UCI and a number of respective time intervals within each repetition of the UCI, and transmitting the one or more repetitions of the UCI in the adjusted set of resources based on the number of repetitions of the UCI and the number of respective time intervals within each repetition.

An apparatus for wireless communication at a UE is described. The apparatus may include a processor, memory in electronic communication with the processor, and instructions stored in the memory. The instructions may be executable by the processor to cause the apparatus to identify a set of resources for transmitting one or more repetitions of UCI over an uplink control channel, adjust the set of resources in a time domain based on a payload size of the UCI and a coding rate, where adjusting the set of resources includes modifying a number of repetitions of the UCI and a number of respective time intervals within each repetition of the UCI, and transmit the one or more repetitions of the UCI in the adjusted set of resources based on the number of repetitions of the UCI and the number of respective time intervals within each repetition.

Another apparatus for wireless communication at a UE is described. The apparatus may include means for identifying a set of resources for transmitting one or more repetitions of UCI over an uplink control channel, means for adjusting the set of resources in a time domain based on a payload size of the UCI and a coding rate, where adjusting the set of resources includes modifying a number of repetitions of the UCI and a number of respective time intervals within each repetition of the UCI, and means for transmitting the one or more repetitions of the UCI in the adjusted set of resources based on the number of repetitions of the UCI and the number of respective time intervals within each repetition.

A non-transitory computer-readable medium storing code for wireless communication at a UE is described. The code may include instructions executable by a processor to identify a set of resources for transmitting one or more repetitions of UCI over an uplink control channel, adjust the set of resources in a time domain based on a payload size of the UCI and a coding rate, where adjusting the set of resources includes modifying a number of repetitions of the UCI and a number of respective time intervals within each repetition of the UCI, and transmit the one or more repetitions of the UCI in the adjusted set of resources based on the number of repetitions of the UCI and the number of respective time intervals within each repetition.

In some examples of the method, apparatuses, and non-transitory computer-readable medium described herein, adjusting the set of resources may include operations, features, means, or instructions for modifying the number of repetitions of the UCI to be equal to a minimum number of repetitions, where the number of respective time intervals within each repetition includes a preconfigured value.

In some examples of the method, apparatuses, and non-transitory computer-readable medium described herein, adjusting the set of resources may include operations, features, means, or instructions for modifying the number of respective time intervals within each repetition to be equal to a minimum number of time intervals, where the number of repetitions of the UCI includes a preconfigured value.

In some examples of the method, apparatuses, and non-transitory computer-readable medium described herein, adjusting the set of resources may include operations, features, means, or instructions for modifying the number of repetitions of the UCI to be equal to a threshold number of repetitions and modifying the number of respective time intervals within each repetition based on the payload size of the UCI and the coding rate.

In some examples of the method, apparatuses, and non-transitory computer-readable medium described herein, the threshold number of repetitions includes one repetition.

In some examples of the method, apparatuses, and non-transitory computer-readable medium described herein, adjusting the set of resources may include operations, features, means, or instructions for modifying a total number of respective time intervals for the one or more repetitions of the UCI based on the payload size of the UCI and the coding rate, where the modified total number of respective time intervals may be different from an integer multiple of a maximum number of respective time intervals within each repetition.

In some examples of the method, apparatuses, and non-transitory computer-readable medium described herein, mapping encoded bits of the UCI to resource elements of the adjusted set of resources, where the encoded bits may be continuously mapped over the respective time intervals within each repetition of the UCI.

Some examples of the method, apparatuses, and non-transitory computer-readable medium described herein may further include operations, features, means, or instructions for identifying a fixed number of physical resource blocks corresponding to the set of resources, where the fixed number of physical resource blocks may be preconfigured, configured via radio resource control signaling, or both.

Some examples of the method, apparatuses, and non-transitory computer-readable medium described herein may further include operations, features, means, or instructions for determining to exclude a portion of channel state information from the one or more repetitions of the UCI based on the payload size of the UCI, where excluding the portion of the channel state information may be based on a number of time intervals configured for the one or more repetitions of the UCI.

In some examples of the method, apparatuses, and non-transitory computer-readable medium described herein, the number of time intervals configured for the one or more repetitions includes a product of a maximum number of repetitions of the UCI and a maximum number of respective time intervals within each repetition.

Some examples of the method, apparatuses, and non-transitory computer-readable medium described herein may further include operations, features, means, or instructions for adjusting the set of resources in a frequency domain based on the payload size of the UCI and the coding rate, where adjusting the set of resources in the frequency domain includes modifying a number of physical resource blocks based on a format of the uplink control channel.

In some examples of the method, apparatuses, and non-transitory computer-readable medium described herein, the set of resources may be adjusted in the frequency domain prior to adjusting the set of resources in the time domain.

In some examples of the method, apparatuses, and non-transitory computer-readable medium described herein, the set of resources may be adjusted in the frequency domain after adjusting the set of resources in the time domain.

Some examples of the method, apparatuses, and non-transitory computer-readable medium described herein may further include operations, features, means, or instructions for determining a minimum number of repetitions of the UCI based on a rank value equal to one, where a payload size of channel state information may be determined based on the rank value.

Some examples of the method, apparatuses, and non-transitory computer-readable medium described herein may further include operations, features, means, or instructions for determining a minimum number of time intervals within each repetition of the UCI based on a rank value equal to one, where a payload size of channel state information may be determined based on the rank value.

Some examples of the method, apparatuses, and non-transitory computer-readable medium described herein may further include operations, features, means, or instructions for determining a first repetition configuration of a maximum number of repetitions of the UCI and a second repetition configuration of a maximum number of respective time intervals within each repetition of the UCI, where modifying the number of repetitions of the UCI and the number of respective time intervals within each repetition of the UCI may be based on the first repetition configuration and the second repetition configuration.

In some examples of the method, apparatuses, and non-transitory computer-readable medium described herein, the first repetition configuration and the second repetition configuration may be configured per uplink control channel resource, per uplink control channel format, or any combination thereof.

In some examples of the method, apparatuses, and non-transitory computer-readable medium described herein, the respective time intervals within each repetition includes a slot.

A method for wireless communication at a base station is described. The method may include receiving, from a UE, one or more time-domain repetitions of UCI over an uplink control channel, the one or more time-domain repetitions being received on an adjusted set of resources based on a payload size of the UCI and a coding rate, where the adjusted set of resources include a number of repetitions of the UCI and a number of respective time intervals within each repetition of the UCI and decoding the one or more time-domain repetitions of the UCI based on the number of repetitions of the UCI and the number of respective time intervals within each repetition.

An apparatus for wireless communication at a base station is described. The apparatus may include a processor, memory in electronic communication with the processor, and instructions stored in the memory. The instructions may be executable by the processor to cause the apparatus to receive, from a UE, one or more time-domain repetitions of UCI over an uplink control channel, the one or more time-domain repetitions being received on an adjusted set of resources based on a payload size of the UCI and a coding rate, where the adjusted set of resources include a number of repetitions of the UCI and a number of respective time intervals within each repetition of the UCI and decode the one or more time-domain repetitions of the UCI based on the number of repetitions of the UCI and the number of respective time intervals within each repetition.

Another apparatus for wireless communication at a base station is described. The apparatus may include means for receiving, from a UE, one or more time-domain repetitions of UCI over an uplink control channel, the one or more time-domain repetitions being received on an adjusted set of resources based on a payload size of the UCI and a coding rate, where the adjusted set of resources include a number of repetitions of the UCI and a number of respective time intervals within each repetition of the UCI and means for decoding the one or more time-domain repetitions of the UCI based on the number of repetitions of the UCI and the number of respective time intervals within each repetition.

A non-transitory computer-readable medium storing code for wireless communication at a base station is described. The code may include instructions executable by a processor to receive, from a UE, one or more time-domain repetitions of UCI over an uplink control channel, the one or more time-domain repetitions being received on an adjusted set of resources based on a payload size of the UCI and a coding rate, where the adjusted set of resources include a number of repetitions of the UCI and a number of respective time intervals within each repetition of the UCI and decode the one or more time-domain repetitions of the UCI based on the number of repetitions of the UCI and the number of respective time intervals within each repetition.

In some examples of the method, apparatuses, and non-transitory computer-readable medium described herein, receiving the one or more time-domain repetitions of the UCI may include operations, features, means, or instructions for receiving the one or more time-domain repetitions of the UCI in a minimum number of repetitions of the UCI, where the number of respective time intervals within each repetition includes a preconfigured value.

In some examples of the method, apparatuses, and non-transitory computer-readable medium described herein, receiving the one or more time-domain repetitions of the UCI may include operations, features, means, or instructions for receiving the one or more time-domain repetitions of the UCI in a minimum number of respective time intervals within each repetition of the UCI, where the number of repetitions of the UCI includes a preconfigured value.

In some examples of the method, apparatuses, and non-transitory computer-readable medium described herein, receiving the one or more time-domain repetitions of the UCI may include operations, features, means, or instructions for receiving the one or more time-domain repetitions of the UCI in a threshold number of repetitions of the UCI and in a minimum number of respective time intervals within each repetition based on the payload size of the UCI and the coding rate.

In some examples of the method, apparatuses, and non-transitory computer-readable medium described herein, the threshold number of repetitions of the UCI includes one repetition.

In some examples of the method, apparatuses, and non-transitory computer-readable medium described herein, receiving the one or more time-domain repetitions of the UCI may include operations, features, means, or instructions for receiving the one or more time-domain repetitions of the UCI in a modified number of respective time intervals, where the modified number of repetitions of the UCI may be different from an integer multiple of a maximum number of respective time intervals within each repetition.

In some examples of the method, apparatuses, and non-transitory computer-readable medium described herein, decoding the one or more time-domain repetitions of the UCI may include operations, features, means, or instructions for decoding the one or more time-domain repetitions of the UCI based on encoded bits that may be continuously mapped over the respective time intervals within each repetition of the UCI.

Some examples of the method, apparatuses, and non-transitory computer-readable medium described herein may further include operations, features, means, or instructions for determining a payload size of channel state information included in the UCI, where the payload size of the channel state information may be based on a rank value equal to one.

In some examples of the method, apparatuses, and non-transitory computer-readable medium described herein, receiving the one or more time-domain repetitions of the UCI may include operations, features, means, or instructions for receiving the one or more time-domain repetitions of the UCI in an adjusted set of frequency-domain resources based on the payload size of the UCI and the coding rate.

Some examples of the method, apparatuses, and non-transitory computer-readable medium described herein may further include operations, features, means, or instructions for configuring a maximum number of repetitions of the UCI and configuring a maximum number of respective time intervals within each repetition of the UCI, the number of repetitions of the UCI and the number of respective time intervals within each repetition of the UCI may be based on the configurations.

DETAILED DESCRIPTION

Figure 1:
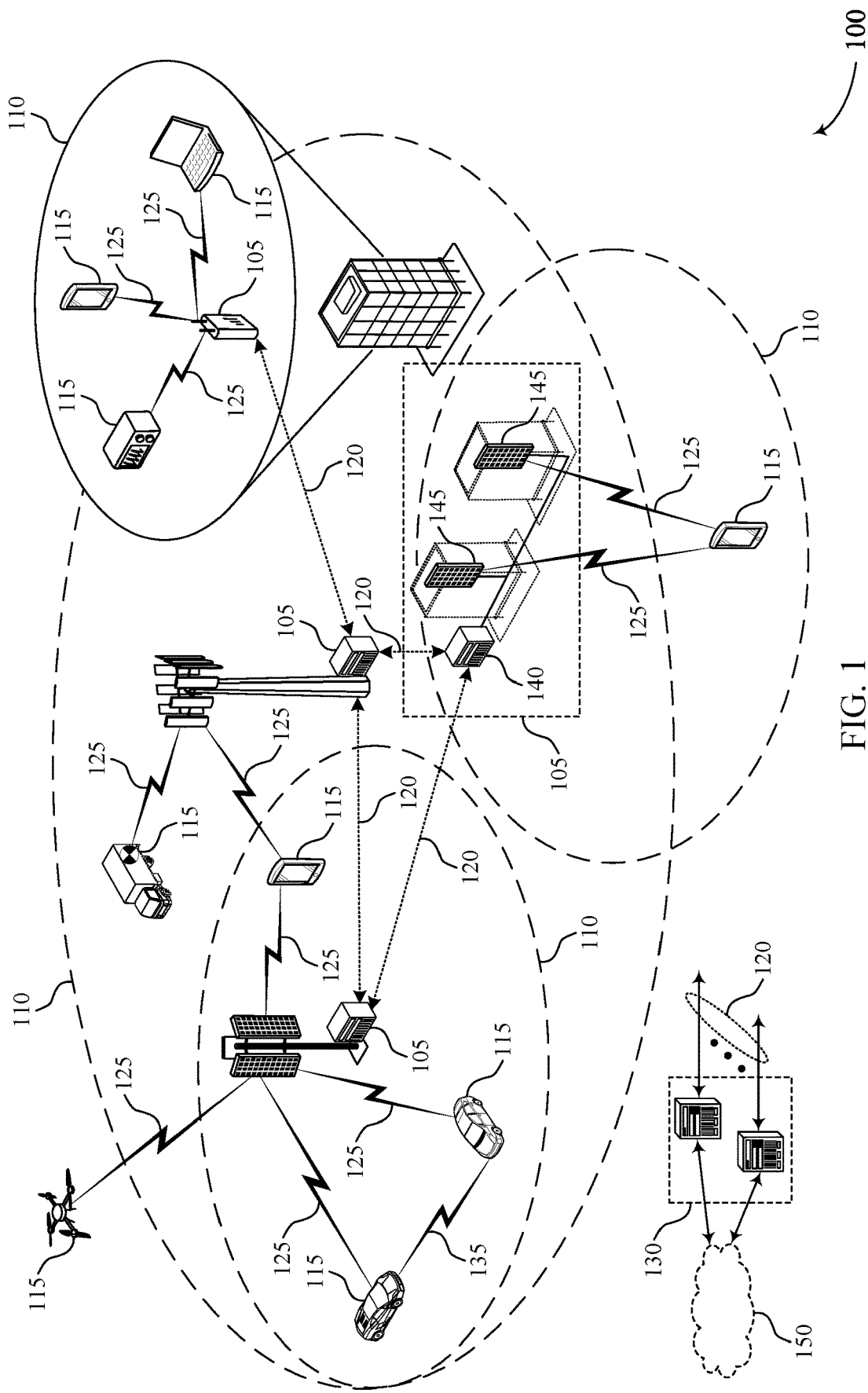
FIG. 1 illustrates an example of a wireless communications system that supports multi-level time-domain scalable uplink channel resources in accordance with aspects of the present disclosure.

In some wireless communications systems, wireless devices may repeat messages to provide coverage enhancement. For example, a user equipment (UE) may transmit repetitions of a message to a base station to increase reliability and provide redundancy in case the base station fails to receive or decode some or all of the message. The UE may transmit messages carrying uplink data over a physical uplink shared channel (PUSCH) in a number of repetitions, where the PUSCH repetitions (e.g., repetitions of the message over PUSCH) are transmitted in consecutive time intervals (e.g., slots). Additionally, or alternatively, the UE may transmit repetitions of messages carrying control information (e.g., uplink control information (UCI)) over a physical uplink control channel (PUCCH), such that each PUCCH repetition is transmitted in a consecutive slot. PUCCH repetitions may increase gains and provide a relatively constant uplink transmission energy, which may be beneficial for a UE in a limited coverage scenario.

In some examples, however, additional gains may be achieved by adjusting one or more parameters of PUCCH repetitions for a control message (e.g., UCI). The techniques described herein enable a UE to adjust PUCCH resources for repetitions of a PUCCH transmission (e.g., UCI), where a first parameter that corresponds to a number of repetitions of a PUCCH transmission and a second parameter that corresponds to a number of time intervals (e.g., slots) within each repetition may be modified to adjust the PUCCH resources. For example, the UE may adjust the parameters and may select resources for the repetitions of the PUCCH transmission based on the parameters. In some cases, the UE may additionally select the resources and/or adjust the parameters based on a coding rate (e.g., a maximum coding rate) or a size of the UCI. For instance, the UE may modify (e.g., reduce) a number of PUCCH repetitions or a number of slots within each repetition such that the PUCCH resources carrying UCI satisfy the maximum code rate and UCI size.

The UE may identify a set of resources (e.g., a set of preconfigured resources) to be used for transmitting UCI PUCCH repetitions and may adjust the resources, for example, in a time domain. The UE may adjust the resources by modifying a number of repetitions (e.g., the first parameter) and a number of time intervals within each repetition (e.g., the second parameter), where the adjusting may be based on a payload size of the UCI, a coding rate (e.g., a maximum coding rate), or both, among other examples. In some cases, the UE may also adjust the payload size of the UCI (e.g., by excluding a portion of channel state information (CSI) from the UCI) or may adjust the resources in the frequency domain (e.g., by modifying a number of physical resource blocks (PRBs)). Additionally, or alternatively, the UE may adjust the resources in the time domain based on a format of the PUCCH.

Some aspects of the subject matter described herein may be implemented to realize one or more advantages. For example, the described techniques may support improvements in communications for UEs in limited-coverage scenarios by improving reliability and efficiency, enhancing transmission gains (e.g., combining or coding gains), and enabling enhancements to transmission power at a transmitting device, among other advantages. As such, the described techniques may provide improved network operations and, in some examples, may promote network efficiencies, enhanced coverage, greater reliability, among other benefits.

Aspects of the disclosure are initially described in the context of wireless communications systems. Aspects of the disclosure are then described using resource configurations and a process flow. Aspects of the disclosure are further illustrated by and described with reference to apparatus diagrams, system diagrams, and flowcharts that relate to multi-level time-domain scalable uplink channel resources.

FIG. 1 illustrates an example of a wireless communications system 100 that supports multi-level time-domain scalable uplink channel resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 may gather channel condition information from a UE 115 to efficiently configure or schedule the channel. This information may be sent from the UE 115 in the form of a channel state report (or CSI report). A channel state report may contain a rank indicator (RI) requesting a number of layers to be used for downlink transmissions (e.g., based on antenna ports of the UE 115), a precoding matrix indicator (PMI) indicating a preference for which precoder matrix should be used (e.g., based on a number of layers), and a channel quality indicator (CQI) representing a highest modulation and coding scheme (MCS) that may be used. In some cases, the RI may be associated with a number of antennas used by a device. CQI may be calculated by a UE 115 after receiving predetermined pilot symbols such as cell-specific reference signals (CRS) or CSI-RS. RI and PMI may be excluded if the UE 115 does not support spatial multiplexing (or is not in a supported spatial mode). In some examples, the types of information included in the CSI report determines a reporting type. Channel state reports may be periodic or aperiodic. Further, channel state reports may have different types based on a codebook used to generate the report. For instance, a Type I CSI report may be based on a first codebook and a Type II CSI report may be based on a second codebook, where the first and second codebooks may be based on different antenna configurations. In some cases, the use of either Type I or Type II CSI reports may improve MIMO performance (as compared to other types of CSI reports). In some cases, a Type II CSI report may be carried at least on a PUSCH, and may provide CSI to a base station 105 with a relatively higher level of granularity (e.g., for MU-MIMO services).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 operating in the wireless communications system 100 may transmit repetitions of messages to a base station 105 to increase redundancy and reliability in communications and may provide enhanced coverage. The UE 115 may, for example, transmit repetitions of UCI over a PUCCH in consecutive time intervals (e.g., slots). The repetitions may be transmitted over a number of consecutive slots such that each slot contains one repetition. Alternatively, in some cases, the UE 115 may transmit the repetitions over a number of consecutive nominal units (e.g., symbols, mini-slots, TTIs). According to the techniques described herein, the UE 115 may identify a set of resources to be used for transmitting the repetitions and may adjust the resources based on a UCI payload size, a coding rate (e.g., a maximum coding rate), or both, among other examples. For example, the UE 115 may adjust the resources by modifying a number of repetitions of the UCI, a number of respective time intervals within each repetition of the UCI, or both. The UE 115 may transmit the repetitions of the UCI using the adjusted set of resources over the PUCCH.

As such, wireless communications system 100 may support techniques for identifying an adjustable number of repetitions and a number of time intervals (e.g., slots) within each interval for PUCCH transmission repetitions in the time domain, in the frequency domain, or both. Specifically, the described techniques provide for two parameters corresponding to different scales or levels of adjustment, where a first parameter (e.g., $N_{rep}^{PUCCH}$) corresponds to a number of repetitions of a PUCCH resource, and a second parameter (e.g., $M_{slot}^{rep}$) corresponds to a number of slots within each PUCCH repetition. The first and second parameters may be used by a UE 115 in determining the resources used for transmitting PUCCH repetitions (e.g., for coverage enhancement), where the resources selected for the PUCCH repetitions may be adjusted based on the first parameter, the second parameter, a size of UCI, and a maximum coding rate). In particular, the UE 115 may adjust the number of repetitions (e.g., to a minimum number of repetitions, $N_{rep,min}^{PUCCH}$) and/or the number of slots within each repetition (e.g., to a minimum number of slots within each repetition, $M_{slot,min}^{rep}$) such that the PUCCH repetitions satisfy the maximum code rate and UCI size.

In some examples, the UE 115 may use various techniques when adjusting the number of repetitions and/or the number of slots within each repetition. For instance, the UE 115 may adjust the number of repetitions to a minimum value (e.g., $N_{rep,min}^{PUCCH}$) while the number of slots within a repetition remains fixed (e.g., at a preconfigured value). In other examples, the UE 115 may adjust the number of slots within each repetition to a minimum value (e.g., $M_{slot,min}^{rep}$) while the number of repetitions remains fixed (e.g., at a preconfigured value). Additionally or alternatively, the UE 115 may first adjust the number of repetitions to a threshold number of repetitions (e.g., one repetition), then the UE 115 may further adjust the number of slots within each repetition until the coding rate and UCI 115 size is satisfied. In yet other examples, the UE 115 may adjust a total number of slots within each repetition, where the adjusted number of slots may not have to be an integer multiple of a maximum number of slots (e.g., $M_{slot}^{rep}$). In any case, the mapping of encoded bits to REs may be continuous over multiple slots within a repetition.

Figure 2:
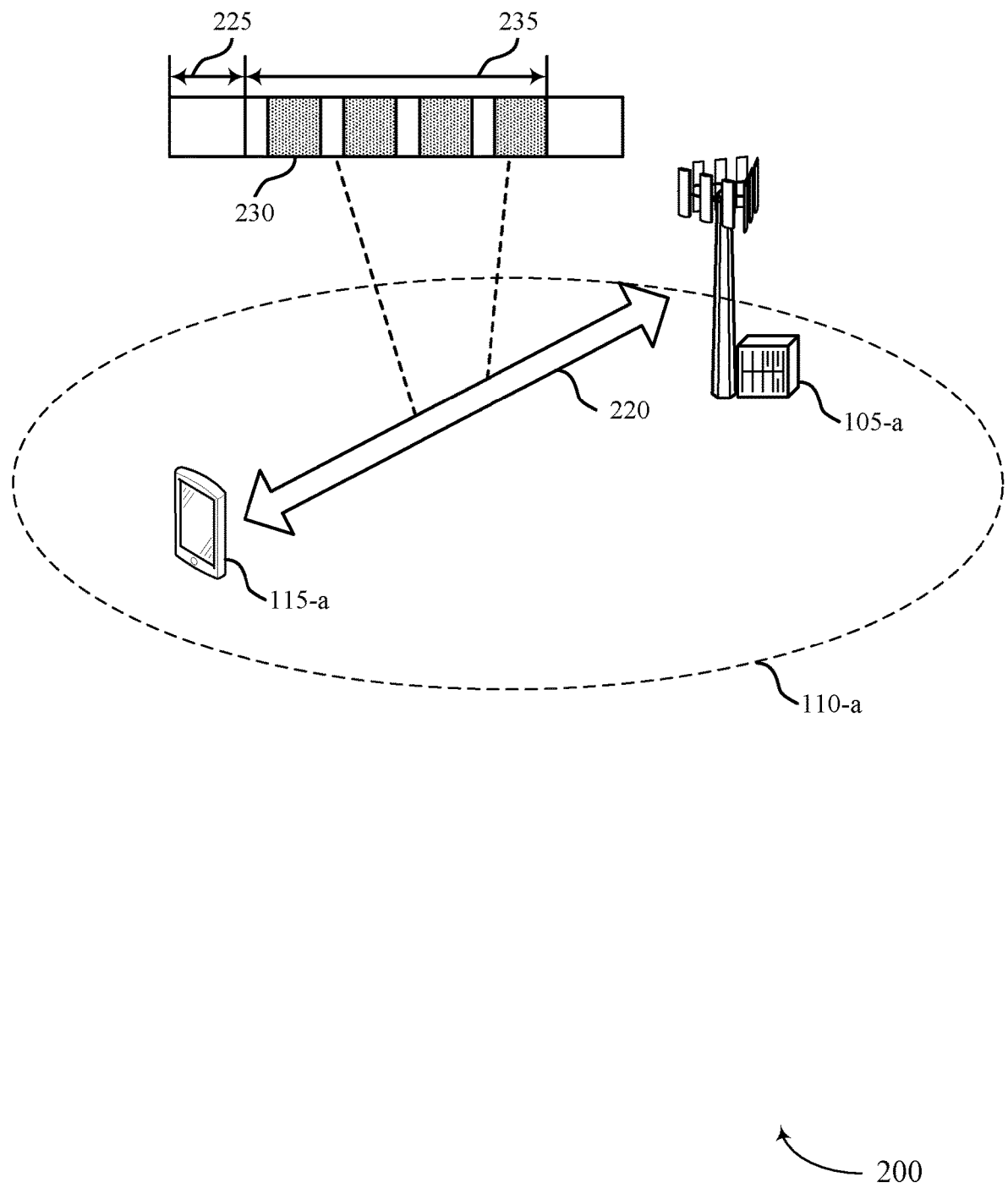
FIG. 2 illustrates an example of a wireless communications system that supports multi-level time-domain scalable uplink channel resources in accordance with aspects of the present disclosure.

FIG. 2 illustrates an example of a wireless communications system 200 that supports multi-level time-domain scalable uplink channel resources in accordance with aspects of the present disclosure. In some examples, the wireless communications system 200 may implement aspects of wireless communications system 100. The wireless communications system 200 may include a UE 115-*a* and a base station 105-*a*, which may be examples of the corresponding devices described herein.

The UE 115-*a* and the base station 105-*a* may communicate over a communication link 220 in a coverage area 110-*a*. For example, the UE 115-*a* may transmit uplink messages (e.g., messages carrying uplink data) over a physical uplink shared channel (PUSCH) and control messages (e.g., messages carrying control information, such as UCI) over a physical uplink control channel (PUCCH). Uplink messages may be transmitted in one or more slots 225, where each slot 225 spans a given time duration.

The PUCCH may be transmitted according to a PUCCH format of a set of PUCCH formats, where each PUCCH format corresponds to a number of symbols, a payload size, and a number of PRBs used for the PUCCH transmission. Some PUCCH formats may support fewer numbers of symbols and may be considered "short" PUCCH formats, while others may support greater numbers of symbols and may be considered "long" PUCCH formats. As an example, a long PUCCH format 3 (PF3) may correspond to 4 to 14 symbols, a payload size less than two (2) bits, and 1 to 16 PRBs (excluding 7, 11, 13, or 14 PRBs). In contrast, a short PUCCH format 2 may correspond to 1 or 2 symbols, a payload size greater than 2 bits, and 1 to 16 PRBs.

In some examples, the UE 115-*a* and the base station 105-*a* may operate with limited uplink coverage. In such scenarios, the UE 115-*a* may transmit PUSCH repetitions (e.g., repetitions of messages carrying uplink data transmitted over a PUSCH) over successive slots 225, which may be referred to as "Type-A" PUSCH repetition. The UE 115-*a* may receive, via communication link 220, downlink control information (e.g., DCI) from the base station 105-*a* that includes scheduling information, where the scheduling information indicates a modulation and coding scheme (MCS) and resource allocation for the PUSCH repetitions. In Type-A PUSCH repetition, the transport block of each slot 225 may be the same, but the encoded bits may differ. That is, the redundancy version may be different for each slot 225. For instance, the DCI may indicate a redundancy version for the first slot, and the UE 115-*a* may determine a redundancy version (e.g., a different redundancy version) for each additional configured slot used for the PUSCH repetitions.

Alternatively, the UE 115-*a* may transmit PUSCH repetitions over consecutive symbols, which may be referred to as "Type-B" PUSCH repetition. The consecutive symbols may be within a slot 225 or across slots, where a nominal repetition includes a number of symbols used to transmit one repetition. The number of nominal repetitions may be indicated by the DCI, which may further include a time-domain resource allocation (e.g., a starting symbol S and a symbol length L) for the first nominal repetition. In some examples, a nominal repetition may be segmented into multiple actual repetitions, for instance, based on a condition such as a slot boundary or a semi-statically configured downlink or invalid symbol. The transport block size may be determined by the first nominal transmission (e.g., based on the nominal symbol length L), and the redundancy version for each actual repetition may be determined by the UE 115-*a* (e.g., by n mod 4).

When transmitting PUCCH in such limited-coverage scenarios, the UE 115-*a* may use long PUCCH formats to increase reliability. Additionally, in such cases, the UE 115-*a* may transmit repetitions of the PUCCH transmissions (e.g., PUCCH repetitions) over multiple time intervals (e.g., slots 225) to enhance coverage and further increase communication reliability. For example, the UE 115-*a* may be configured (e.g., via a radio resource control (RRC) message) to repeat a PUCCH transmission (e.g., UCI) over 2 slots, 4 slots, or 8 slots, among other examples, where each slot includes a PUCCH repetition. In some cases, the UE 115-*a* may transmit PUCCH using Type-A repetition, where the UE 115-*a* transmits PUCCH repetitions over consecutive slots, or using Type-B repetition, where the UE 115-*a* transmits PUCCH repetitions over consecutive symbols or nominal units. Additionally, or alternatively, the UE 115-*a* may dynamically adjust the number of slots used to transmit PUCCH repetitions, for instance, based on an indication received in DCI. In the example of FIG. 2, the UE 115-*a* may transmit a PUCCH 235 using Type-A repetition over four slots 225, where each slot 225 includes a PUCCH repetition 230.

In some examples, the UE 115-*a* may adjust frequency-domain resources used to transmit PUCCH repetitions based on a code rate (e.g., a maximum code rate), a UCI payload size, or both. For example, the UE 115-*a* may be configured with (e.g., allocated) a starting PRB (e.g., a starting location of the frequency domain resource) and a number of PRBs $N_{RB}^{PUCCH}$. In some cases, the number of PRBs may be based on the PUCCH format, where $N_{RB}^{PUCCH}$ may be greater than one if the PUCCH format is PF2 or PF3 (i.e., a PUCCH format that supports multiple PRBs). The UE 115-*a* may adjust the number of PRBs $N_{RB}^{PUCCH}$, for instance, based on a maximum coding rate r or the UCI payload size ($O_{UCI}+O_{CRC}$) according to the equation (e.g., Equation 1):

$$(O_{UCI}+O_{CRC}) \leq N_{RB}^{PUCCH} \cdot N_{sc,ctrl}^{RB} \cdot N_{symb-UCI}^{PUCCH} \cdot Q_m \cdot r \quad (1)$$

Here, the UCI payload size ($O_{UCI}+O_{CRC}$) may be the sum of the UCI size $O_{UCI}$ and a cyclic redundancy check (CRC) size $OC_{CRC}$. $N_{sc,ctrl}^{RB}$ represents the number of resource elements that UCI can occupy per symbol and per number of PRBs, for instance, based on the PUCCH format size and/or an associated orthogonal cover code (OCC) size. $N_{symb-UCI}^{PUCCH}$ is the number of symbols of UCI (e.g., excluding any demodulation reference signal (DMRS) symbols). $Q_m$ is the modulation order; for instance, for quadrature phase shift keying (QPSK) modulation, $Q_m$ may be equal to 2, while for $$\frac{\pi}{2}$$

binary phase shift keying (BPSK) modulation, $Q_m$ may be equal to 1. Thus, in Equation 1, $N_{RB}^{PUCCH} \cdot N_{sc,ctrl}^{RB} \cdot N_{symb-UCI}^{PUCCH}$ may represent the number of encoded bits per slot and per PRB.

The maximum coding rate r may be preconfigured to be a given value, e.g., of a set of values. For instance, r may be one of 0.08, 0.15, 0.25, 0.35, 0.45, 0.6, or 0.8, among other examples. Thus, as r is preconfigured, the UE 115-a may change the number of PRBs $N_{RB}^{PUCCH}$ based on the value of r and the value of the UCI payload size ($O_{UCI}+O_{CRC}$) such that Equation 1 is satisfied. For example, the UE 115-a may choose a minimum number of PRBs $N_{RB}^{PUCCH}$ (e.g., $N_{RB,min}^{PUCCH}$) that satisfies Equation 1. A smaller (e.g., minimum) number of PRBs may reduce a transmit bandwidth, thereby conserving power and increasing a signal-to-noise ratio (SNR), which may be beneficial in scenarios with limited transmission power or limited coverage.

In some examples, if the total UCI payload size ($O_{UCI}+O_{CRC}$) is too large (e.g., Equation 1 is not satisfied even with a minimum value of $N_{RB}^{PUCCH}$), the UE 115-a may determine to omit (e.g., drop) portions of the CSI of the UCI (e.g., such that the value of $O_{UCI}$ is reduced). In some cases, the UE 115-a may omit CSI according to a priority of the CSI. For instance, the UE 115-a may first omit CSI-part2 reports (e.g., partial or full reports) until Equation 1 is satisfied. If the UE 115-a omits all existing CSI-part2 reports but Equation 1 is still unsatisfied, the UE 115-a may omit CSI-part1 reports according to priority. In some cases, the UE 115-a may determine to reduce the UCI payload size in order to reduce the coding rate, which may increase transmission reliability. In any case, the UE 115-a may adjust one or more of the number of PRBs $N_{RB}^{PUCCH}$, the UCI payload size via $O_{UCI}$, or some combination thereof, to satisfy Equation 1.

The UE 115-a may additionally or alternatively adjust resources in the time domain for transmitting PUCCH repetitions. For example, the UE 115-a may adjust a number of PUCCH repetitions 230 included in PUCCH transmission 235. That is, the UE 115-a may determine to use an increased number of PUCCH repetitions 230 for PUCCH transmission 235, for instance, based on the configured maximum coding rate r, the UCI payload size, or both, where each PUCCH repetition 230 corresponds to one slot 225. Increasing the number of PUCCH repetitions 230 may enable the UE 115-a to maintain a constant per-bit transmission energy, which may enhance coverage and reduce transmission power. Further, the UE 115-a may increase gain (e.g., Chase combining gain), for instance, by 3 dB per additional slot 225 including an additional PUCCH repetition 230.

However, the gains achieved by increasing a number of PUCCH repetitions 230, where each PUCCH repetition 230 corresponds to one slot 225, may be limited, and the UE 115-a may further increase gains by transmitting a PUCCH repetition 230 over multiple slots 225 (e.g., instead of one slot 225). That is, a PUCCH repetition 230 transmitted over multiple slots 225 may have longer encoded bits, which may in turn provide incremental redundancy (IR) coding gain. For example, an increased number of encoded bits may enable the UE 115-a to reduce the coding rate, thereby increasing IR gain.

According to the techniques described herein, a UE 115-a may implement techniques for repetitions of PUCCH transmissions that maximize the gains that may be achieved through such repetitions. Specifically, the UE 115-a may utilize such techniques to efficiently select, modify, or adjust a configured set of resources for repetition(s) of a PUCCH transmission. In such cases, the UE 115-a may be configured with two parameters corresponding to different scales (e.g., levels) of adjustment to be used for transmitting PUCCH repetitions 230 in a PUCCH transmission 235. The first parameter may correspond to a number of repetitions (e.g., PUCCH repetitions 230) and the second parameter may correspond to a number of time intervals (e.g., slots 225, mini-slots, symbols) within each repetition. The UE 115-a may use the parameters to determine resources (e.g., time resources, frequency resources) to use to transmit the PUCCH repetitions 230. For instance, the UE 115-a may adjust the first parameter, the second parameter, or both, and may select or modify resources for the PUCCH repetitions based on the adjusted parameters. The parameters may be adjusted based on a UCI payload size, a maximum coding rate, or both, such as described with more detail with reference to FIG. 3.

In some examples, the ULE 115-a may be configured with a maximum value of the first parameter (e.g., a maximum number of repetitions) and/or a maximum value of the second parameter (e.g., a maximum number of time intervals within each repetition). For instance, the UE 115-a may be configured with a first repetition configuration corresponding to a maximum value of the first parameter and a second repetition configuration corresponding to a maximum value of the second parameter. Each repetition configuration may be configured per uplink control channel resource (e.g., PUCCH resource) or per uplink control channel format (e.g., PUCCH format) parameters may be configured per PUCCH resource. For instance, a PUCCH format 3 (PF3) may be associated with a first repetition configuration with a maximum value of four repetitions and a second repetition configuration with a maximum value of two time intervals. The PUCCH repetitions 230 may be PF3 PUCCH repetitions 230. The UE 115-a may thus adjust the first and second parameters and corresponding resources used to transmit PUCCH repetitions 230 according to the first and second repetition configurations.

Based on the one or more repetitions of the PUCCH transmission, the base station 105-a may receive the PUCCH repetitions 230 on the adjusted resources selected by the UE 115-a. As such, the base station 105-a may receive the PUCCH transmission repetitions based on the number of repetitions and a number or quantity of time intervals (e.g., slots, TTIs, symbols, or the like) within each repetition.

Figure 3:
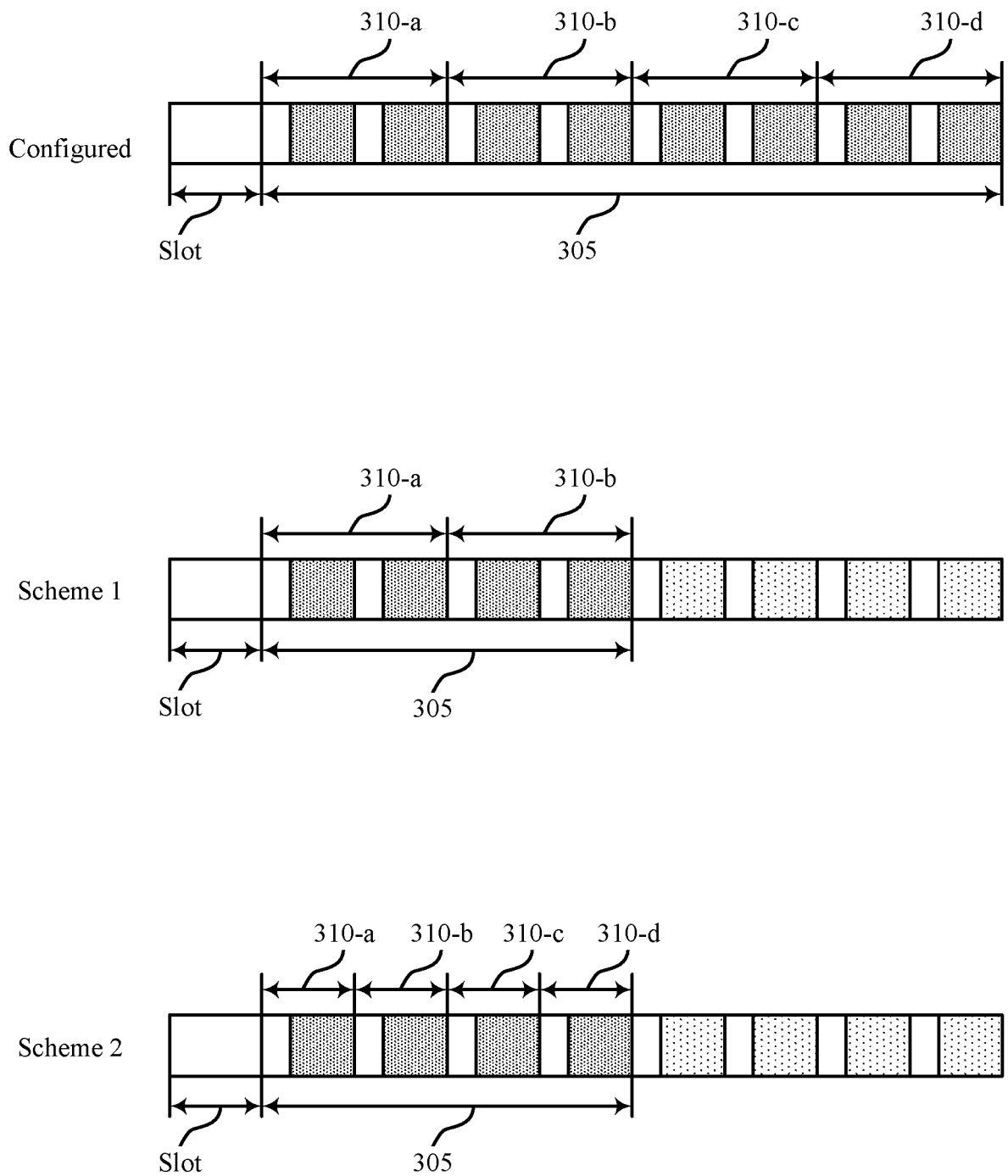
FIG. 3 illustrates an example of resource configurations that support multi-level time-domain scalable uplink channel resources in accordance with aspects of the present disclosure.

FIG. 3 illustrates an example of a resource configuration 300 that supports multi-level time-domain scalable uplink channel resources in accordance with aspects of the present disclosure. In some examples, the resource configuration 300 may implement aspects of wireless communications systems 100 or 200. For example, the resource configuration 300 may represent configurations of resources used by a base station (e.g., a base station 105 as described herein) and a UE (e.g., a UE 115 as described herein) to communicate control information (e.g., UCI) via an uplink control channel (e.g., a PUCCH).

A UE may transmit messages carrying control information, such as UCI, over an uplink control channel, such as a PUCCH, during one or more time intervals (e.g., slots, mini-slots, symbols, etc.). The messages may be transmitted using resources (e.g., time resources, frequency resources) identified by the UE. In some cases, such as in scenarios where the UE has limited uplink coverage, the UE may transmit repetitions of the messages (e.g., PUCCH repetitions) to increase gain, reliability, and redundancy. In such cases, each PUCCH repetition may be transmitted over a set of resources in a consecutive slot. As illustrated in FIG. 3, the UE may transmit a PUCCH transmission 305 that includes one or more PUCCH repetitions 310 (e.g., repetitions of some uplink control information over PUCCH).

The UE may be configured with parameters for one or more of the PUCCH repetitions 310, e.g., via RRC signaling, DCI, etc. Parameters may include, but are not limited to, an MCS, a transmission block size, a code rate (e.g., a maximum code rate), time-domain resource allocations (e.g., a starting symbol, a symbol length, a time interval length), frequency-domain resource allocations (e.g., PRBs, such as a starting PRB, a number of PRBs, etc.), a number of repetitions, a time interval over which each repetition may be transmitted, or the like. In some cases, the parameters may be based on a PUCCH format. The UE may use the parameters to determine or identify the resources used for transmitting the PUCCH repetitions 310. In the first example of FIG. 3, the UE may be configured to transmit four repetitions using two slots per repetition. That is, the UE may transmit PUCCH transmission 305 using four repetitions 310-$a$ through 310-$d$, where each repetition 310 is transmitted over two slots.

In some examples, however, the UE may further increase gain, reliability, and redundancy by modifying one or more configured parameters for the PUCCH repetitions 310. For example, according to the techniques described herein, the UE may identify two parameters corresponding to two scales (e.g., levels) of adjustment, where a first parameter corresponds to a number of repetitions of a PUCCH resource (e.g., a number of PUCCH repetitions 310) and a second parameter corresponds to a number of time intervals (e.g., slots) within each repetition (e.g., PUCCH repetitions 310). The parameters may be modified based on a payload size of the UCI, a payload size of CSI included in the UCI, a coding rate, or some combination thereof. The UE may use the parameters to determine the resources to use for transmitting the PUCCH repetitions 310, where the resources are adjusted based on the first parameter, the second parameter, or both. That is, the UE may adjust the first parameter, the second parameter, or both, such that the resources satisfy a maximum code rate, a payload size of the UCI, or both, according to the following equation (e.g., Equation 2):

$$(O_{UCI}+O_{CRC}) \leq N_{RB}^{PUCCH} \cdot N_{sc,ctrl}^{RB} \cdot N_{symb-UCI}^{PUCCH} \cdot Q_m \cdot N_{rep}^{PUCCH} \cdot M_{slot}^{rep} \cdot r \quad (2)$$

The UCI payload size $O_{UCI}+O_{CRC}$, the number of PRBs $N_{RB}^{PUCCH}$, the number of resource elements $N_{sc,ctrl}^{RB}$, the number of UCI symbols $N_{symb-UCI}^{PUCCH}$, the modulation order $Q_m$, and the maximum coding rate r in Equation 2 may be the same values as described with reference to FIG. 2 and Equation 1. For example, the maximum coding rate r may be configured to be one of a set of fixed values as described with reference to FIG. 2. However, in Equation 2, $N_{RB}^{PUCCH}$ may be a fixed value and may not be scalable by the UE. For instance, $N_{RB}^{PUCCH}$ may be predefined based on the PUCCH format or may be preconfigured (e.g., via RRC signaling). In Equation 2, $N_{rep}^{PUCCH}$ may represent the first parameter, i.e., the number of PUCCH repetitions 310 to be transmitted in the PUCCH transmission 305, and $M_{slot}^{rep}$ may represent the second parameter, i.e., the number of slots within each PUCCH repetition 310. As illustrated in the first example of FIG. 3, the UE may be configured such that $N_{rep}^{PUCCH}=4$ and $M_{slot}^{rep}=2$.

The UE may thus adjust $N_{rep}^{PUCCH}$ and $M_{slot}^{rep}$ based on the maximum coding rate r and the total UCI payload size $O_{UCI}+O_{CRC}$. For example, if r is a preconfigured value as described with reference to FIG. 2, the UE may adjust $N_{rep}^{PUCCH}$ and $M_{slot}^{rep}$ based on the payload size such that Equation 2 is satisfied. In some examples, either $N_{rep}^{PUCCH}$ or $M_{slot}^{rep}$ may be configured to be fixed, and the UE may adjust the other value to be a minimum value (e.g., $M_{slot,min}^{rep}$ or $N_{rep,min}^{PUCCH}$). In some cases, the UE may adjust $N_{RB}^{PUCCH}$ but may refrain from adjusting $M_{slot}^{rep}$, or the UE may adjust $M_{slot}^{rep}$ but may refrain from adjusting $N_{rep}^{PUCCH}$. In other cases, the UE may adjust both $N_{rep}^{PUCCH}$ and $M_{slot}^{rep}$. In still other cases, the UE may adjust a total number of slots over which the PUCCH transmission 305 is repeated over, and the total number of slots may be different from an integer multiple of $M_{slot}^{rep}$.

In the example of scheme 1 of FIG. 3, the UE may modify $N_{rep}^{PUCCH}$ to be equal to $N_{rep,min}^{PUCCH}$ and may refrain from modifying $M_{slot}^{rep}$. That is, $M_{slot}^{rep}$ may be configured to be fixed at some value (e.g., a value of 2), and the UE may determine a value of $N_{rep,min}^{PUCCH}$ (e.g., a minimum value of $N_{rep}^{PUCCH}$) based on the UCI payload size and the maximum coding rate such that Equation 2 is satisfied. In some examples, when $M_{slot}^{rep}$ is configured to be fixed, $M_{slot}^{rep}$ may represent a maximum value; that is, $M_{slot}^{rep}$ may represent a maximum number of slots per PUCCH repetition 310. The UE may thus determine and/or adjust resources for the PUCCH repetitions 310 according to the values of $N_{rep,min}^{PUCCH}$ and $M_{slot}^{rep}$. As illustrated in scheme 1, $N_{rep,min}^{PUCCH}=2$ and $M_{slot}^{rep}=2$; therefore, the UE transmits PUCCH transmission 305 using two PUCCH repetitions 310 (e.g., PUCCH repetition 310-$a$ and PUCCH repetition 310-$b$), where each PUCCH repetition 310 includes two slots.

In the example of scheme 2 of FIG. 3, the UE may modify $M_{slot}^{rep}$ to be equal to $M_{slot,min}^{rep}$ and may refrain from modifying $N_{rep}^{PUCCH}$. That is, $N_{rep}^{PUCCH}$ may be configured to be fixed at some value (e.g., a value of 4), and the UE may determine a value of $M_{slot,min}^{rep}$ (e.g., a minimum value of $M_{slot}^{rep}$) based on the UCI payload size and the maximum coding rate such that Equation 2 is satisfied. In some examples, when $N_{rep}^{PUCCH}$ is configured to be fixed (or preconfigured), $N_{rep}^{PUCCH}$ may represent a maximum value; that is, $N_{rep}^{PUCCH}$ may represent a maximum number PUCCH repetitions 310. The UE may thus determine and/or adjust resources for the PUCCH repetitions 310 according to the values of $M_{slot,min}^{rep}$ and $N_{rep}^{PUCCH}$. As illustrated in scheme 2, $M_{slot,min}^{rep}=1$ and $N_{rep}^{PUCCH}=4$; therefore, the UE transmits PUCCH transmission 305 using four PUCCH repetitions 310 (e.g., PUCCH repetitions 310-$a$ through 310-$d$), where each PUCCH repetition 310 includes one slot.

In some examples, the UE may modify both $N_{rep}^{PUCCH}$ and $M_{slot}^{rep}$. For instance, the UE may first modify $N_{rep}^{PUCCH}$ and may then modify $M_{slot}^{rep}$. In some cases, the UE may first modify $N_{rep}^{PUCCH}$ to be a threshold value (e.g., a threshold number of repetitions) before modifying $M_{slot}^{rep}$. As an example, the threshold value may be equal to 1 (e.g., the threshold number of repetitions is one repetition); thus, the UE may modify $N_{rep}^{PUCCH}$, and if $N_{rep}^{PUCCH}=1$, the UE may then modify $M_{slot}^{rep}$.

In some cases, the UE may additionally or alternatively modify a total number of slots over which the PUCCH transmission 305 is repeated. For instance, the UE may modify the total number of slots to be a minimum total number (e.g., $Total_{min}$). Put another way, the UE may modify the total number of slots such that $Total_{min} < N_{rep}^{PUCCH} \cdot M_{slot}^{rep}$) The UE may adjust the total number of slots based on the UCI payload size and the maximum coding rate. However, the modified total number of slots may be different from an integer multiple of a maximum number of respective time intervals within each repetition, e.g., Total$_{min}$ may not be an integer multiple of $M_{slot}^{rep}$. For instance, in the first example of FIG. 3, the total number of slots for PUCCH transmission 305 is equal to 8, and the maximum value of $M_{slot}^{rep}$ may be equal to 2. The UE may adjust the total number of slots such that the total number of slots is different from an integer multiple of $M_{slot}^{rep}$ (e.g., 2). For example, the UE may adjust the total number of slots to be five (e.g., Total$_{min}$=5), which is different from an integer multiple of 2.

The UE may modify or adjust other terms in Equation 2 as long as Equation 2 remains satisfied. For example, the UE may adjust the total UCI payload size based on a number (e.g., a maximum) of time intervals configured for the PUCCH repetitions 310. The number of time intervals may be equal to the product of the maximum values of $N_{rep}^{PUCCH}$ and $M_{slot}^{rep}$ (e.g., $N_{rep}^{PUCCH} \cdot M_{slot}^{rep}$). If the total UCI payload size is greater than Equation 2, where the values of $N_{rep}^{PUCCH}$ and $M_{slot}^{rep}$ in Equation 2 are equal to the maximum values of $N_{rep}^{PUCCH}$ and $M_{slot}^{rep}$, the UE may adjust the total UCI payload size by determining to exclude (e.g., dropping) portions of the CSI of the UCI (e.g., such that the value of $O_{UCI}$ is reduced) until Equation 2 is satisfied. In some cases, the UE may omit CSI according to a priority of the CSI. For instance, the UE may first omit CSI-part2 reports (e.g., partial or full reports) until Equation 2 is satisfied. If the UE omits all existing CSI-part2 reports but Equation 2 is still unsatisfied, the UE may omit CSI-part1 reports according to priority. Put another way, the UE may exclude CSI portions until the total UCI payload size associated with a number $N^{reported}$ CSI reports satisfies Equation 2, and the total UCI payload size associated with $N^{reported}+1$ CSI reports is higher than $N^{reported}$.

In some examples, the UE may determine minimum values for $N_{rep}^{PUCCH}$ and $M_{slot}^{rep}$ (e.g., $N_{rep,min}^{PUCCH}$ and $M_{slot,min}^{rep}$) based on a rank value. For instance, the UE may determine $N_{rep,min}^{PUCCH}$ and/or $M_{slot,min}^{rep}$ based on a rank value being equal to 1. The UE may further determine a payload size of the CSI included in the UCI based on the rank value.

In some cases, the UE may determine repetition configurations. For instance, the UE may determine a first repetition configuration of a maximum number of PUCCH repetitions 310 (i.e., a maximum value of $N_{rep}^{PUCCH}$) and a second repetition configuration of a maximum number of slots within each PUCCH repetition 310 (e.g., a maximum value of $M_{slot}^{rep}$). The first repetition configuration and the second repetition configuration may be configured per uplink control channel resource (e.g., PUCCH resource), per uplink control channel format (e.g., PUCCH format), or some combination thereof. In some examples, the base station may configure the first repetition configuration and the second repetition configuration. The UE may modify $N_{rep}^{PUCCH}$ and $M_{slot}^{rep}$ based on the first and second repetition configurations.

Once the UE has modified $N_{rep}^{PUCCH}$, $M_{slot}^{rep}$, or both, as well as any other parameters, according to the techniques described herein, the UE may map encoded bits of the UCI to resource elements of the adjusted set of resources to be used for transmitting the PUCCH repetitions 310. The encoded bits may be continuously mapped over the respective time intervals within each PUCCH repetition 310. For instance, in the first example of FIG. 3, the UE may continuously map encoded bits of the UCI over both slots of each PUCCH repetition 310. The UE may transmit the PUCCH repetitions 310 in the adjusted set of resources based on the parameters.

The base station may receive the PUCCH repetitions 310 on the adjusted set of resources. For instance, the base station may receive PUCCH repetitions 310 in a minimum number of repetitions (e.g., $N_{rep,min}^{PUCCH}$), in a threshold number of repetitions, in a minimum number of respective slots (e.g., $M_{slot,min}^{rep}$), in a modified number of respective slots, or some combination thereof. In some cases, the base station may also determine a CSI payload size, for instance, based on a rank value being equal to 1. The base station may decode the received PUCCH repetitions 310 based on the parameters and, in some examples, based on encoded bits that are continuously mapped over the respective slots within each PUCCH repetition 310.

Figure 4:
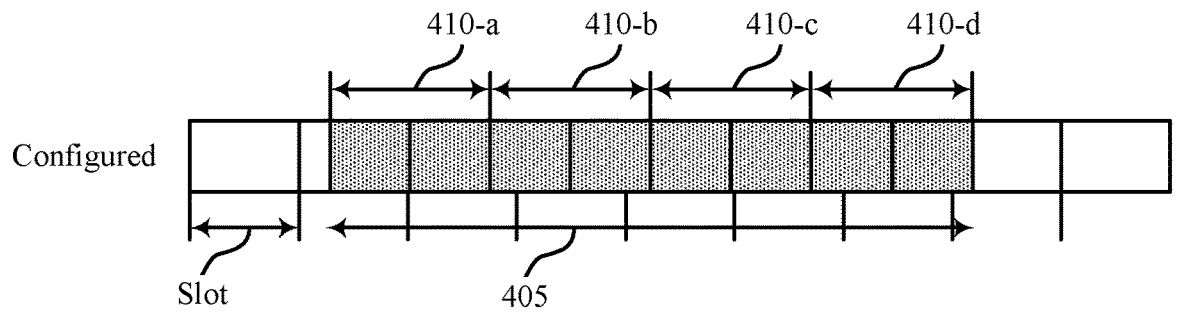
FIG. 4 illustrates an example of resource configurations that support multi-level time-domain scalable uplink channel resources in accordance with aspects of the present disclosure.
Figure 4:
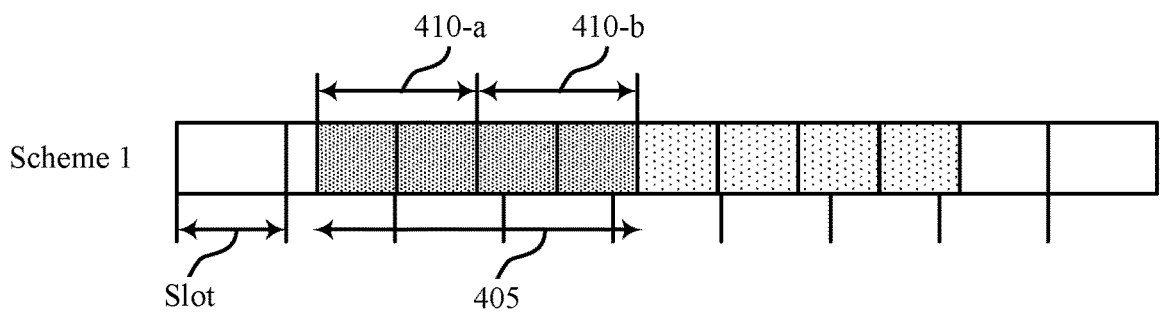
Figure 4:
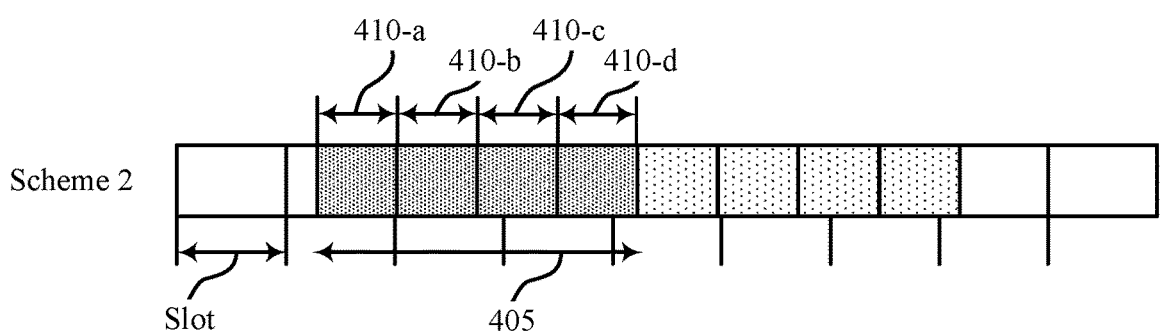

FIG. 4 illustrates an example of a resource configuration 400 that supports multi-level time-domain scalable uplink channel resources in accordance with aspects of the present disclosure. In some examples, the resource configuration 400 may implement aspects of wireless communications systems 100 or 200. For example, the resource configuration 400 may represent configurations of resources used by a base station (e.g., a base station 105 as described herein) and a UE (e.g., a UE 115 as described herein) to communicate control information (e.g., UCI) via an uplink control channel (e.g., a PUCCH).

As described with reference to FIG. 3, a UE may modify or configure parameters and may transmit one or more PUCCH repetitions 410 in a PUCCH transmission 405 based on the parameters. However, in the example of FIG. 4, the PUCCH repetitions 410 may be transmitted over consecutive symbols. That is, each respective time interval within each PUCCH repetition 410 may be a number of consecutive symbols (e.g., instead of slots, as described with reference to FIG. 3), which may also be referred to as a nominal unit. A PUCCH repetition 410 may therefore include a number of respective nominal units.

The first parameter described with reference to FIG. 3 may, in the example of FIG. 4, correspond to a number of repetitions of a PUCCH resource (e.g., a number of PUCCH repetitions 410), and the second parameter described with reference to FIG. 3 may, in the example of FIG. 4, correspond to a number of time intervals (e.g., nominal units) within each repetition (e.g., PUCCH repetitions 410). The UE may modify the parameters as described herein, e.g., based on a payload size of the UCI, a payload size of CSI included in the UCI, a coding rate, or some combination thereof. The UE may use the parameters to determine the resources to use for transmitting the PUCCH repetitions 410. That is, the UE may adjust the first parameter, the second parameter, or both, such that the resources satisfy a maximum code rate, a payload size of the UCI, or both, according to the following equation (e.g., Equation 3):

$$(O_{UCI}+O_{CRC}) \leq N_{RB}^{PUCCH} \cdot N_{sc,ctrl}^{RB} \cdot N_{symb-UCI}^{PUCCH} \cdot Q_m \cdot N_{rep}^{PUCCH} \cdot M_{nominalUnit}^{rep} \cdot r \quad (3)$$

The UCI payload size $O_{UCI}+O_{CRC}$, the number of PRBs $N_{RB}^{PUCCH}$, the number of resource elements $N_{sc,ctrl}^{RB}$, the number of UCI symbols $N_{symb-UCI}^{PUCCH}$, the modulation order $Q_m$, and the maximum coding rate r in Equation 3 may be the same values as described with reference to FIG. 3 and Equation 3. However, in Equation 3, $N_{RB}^{PUCCH}$ may represent the second parameter, i.e., the number of nominal within each PUCCH repetition 410. As illustrated in the first example of FIG. 4, the UE may be configured such that $N_{rep}^{PUCCH}=4$ and $M_{nominalUnit}^{rep}=2$. It should be noted that the nominal units described in FIG. 4 may be within a slot or may be across slots. For example, the nominal units illustrated in each PUCCH repetition 410 of FIG. 4 span multiple slots.

The UE may thus adjust $N_{rep}^{PUCCH}$ and $M_{nominalUnit}^{rep}$ based on the maximum coding rate r and the total UCI payload size $O_{UCI}+O_{CRC}$. For example, if r is a preconfigured value as described with reference to FIG. 2, the UE may adjust $N_{rep}^{PUCCH}$ and $M_{nominalUnit}^{rep}$ based on the payload size such that Equation 3 is satisfied. In some examples, either $N_{rep}^{PUCCH}$ or $M_{nominalUnit}^{rep}$ may be configured to be fixed, and the UE may adjust the other value to be a minimum value (e.g., $M_{nominalUnit,min}^{rep}$ or $N_{rep,min}^{PUCCH}$). In some cases, the UE may adjust $N_{rep}^{PUCCH}$ but may refrain from adjusting $M_{nominalUnit}^{rep}$, or the UE may adjust $M_{nominalUnit}^{rep}$ but may refrain from adjusting $N_{rep}^{PUCCH}$. In other cases, the UE may adjust both $N_{rep}^{PUCCH}$ and $M_{nominalUnit}^{rep}$. In still other cases, the UE may adjust a total number of time intervals (e.g., nominal units) over which the PUCCH transmission 405 is repeated, and the total number of nominal units may be different from an integer multiple of $M_{nominalUnit}^{rep}$.

In the example of scheme 1 of FIG. 4, the UE may modify $N_{rep}^{PUCCH}$ to be equal to $N_{rep,min}^{PUCCH}$ and may refrain from modifying $M_{nominalUnit}^{rep}$. That is, $M_{nominalUnit}^{rep}$ may be configured to be fixed at a value of 2, and the UE may determine a value of $N_{rep,min}^{PUCCH}$ (e.g., a minimum value of $N_{rep}^{PUCCH}$) based on the UCI payload size and the maximum coding rate such that Equation 3 is satisfied. In some examples, when $M_{nominalUnit}^{rep}$ is configured to be fixed, $M_{nominalUnit}^{rep}$ may represent a maximum value; that is, $M_{slot}^{rep}$ may represent a maximum number of nominal units per PUCCH repetition 410. The UE may thus determine and/or adjust resources for the PUCCH repetitions 410 according to the values of $N_{rep,min}$ and $M_{nominalUnit}^{rep}$. As illustrated in scheme 1, $N_{rep,min}^{PUCCH}=2$ and $M_{nominalUnit}^{rep}=2$; therefore, the UE transmits PUCCH transmission 405 using two PUCCH repetitions 410 (e.g., PUCCH repetition 410-a and PUCCH repetition 410-b), where each PUCCH repetition 410 includes nominal units.

In the example of scheme 2 of FIG. 4, the UE may modify $M_{nominalUnit}^{rep}$ to be equal to $M_{nominalUnit,min}^{rep}$ and may refrain from modifying $N_{rep}^{PUCCH}$. That is, $N_{rep}^{PUCCH}$ may be configured to be fixed at a value of 4, and the UE may determine a value of $M_{nominalUnit,min}^{rep}$ (e.g., a minimum value of $M_{nominalUnit}^{rep}$) based on the UCI payload size and the maximum coding rate such that Equation 3 is satisfied. In some examples, when $N_{rep}^{PUCCH}$ is configured to be fixed, $N_{rep}^{PUCCH}$ may represent a maximum value; that is, $N_{rep}^{PUCCH}$ may represent a maximum number PUCCH repetitions 410. The UE may thus determine and/or adjust resources for the PUCCH repetitions 410 according to the values of $M_{nominalUnit,min}^{rep}$ and $N_{rep}^{PUCCH}$. As illustrated in scheme 2, $M_{nominalUnit,min}^{rep}=1$ and $N_{rep}^{PUCCH}=4$; therefore, the UE transmits PUCCH transmission 405 using four PUCCH repetitions 410 (e.g., PUCCH repetitions 410-a through 410-d), where each PUCCH repetition 410 includes one slot.

In some examples, FIG. 4 may represent a resource configuration 400 that uses fewer overall time-domain resources than resource configuration 300 as described with reference to FIG. 3. For example, if the nominal unit described in FIG. 4 is a number of symbols that is less than a slot, the total time interval over which PUCCH transmission 405 is transmitted may be less than the total time interval over which PUCCH transmission 305 is transmitted. That is, even if the number of PUCCH repetitions 310 and the number of PUCCH repetitions 410 is the same, and the number of respective time intervals per PUCCH repetition 310 or PUCCH repetition 410 is the same, the UE may transmit PUCCH repetitions 410 in less time than PUCCH repetitions 310, because the time intervals within each PUCCH repetition 410 may be smaller than the time intervals within each PUCCH repetition 310. Put another way, a value of $N_{rep}^{PUCCH}$ may be the same in the examples of scheme 1 of both FIGS. 3 and 4, and the value of $M_{slot}^{rep}$ in the example of scheme 1 of FIG. 3 may be the same as the value of $M_{nominalUnit}^{rep}$ in the example of scheme 1 of FIG. 4. However, as illustrated, PUCCH transmission 405 in scheme 1 is transmitted over approximately three slots, while PUCCH transmission 305 in scheme 1 is transmitted over four slots.

In some examples, the UE may modify both $N_{rep}^{PUCCH}$ and $M_{nominalUnit}^{rep}$. For instance, the UE may first modify $N_{rep}^{PUCCH}$ and may then modify $M_{nominalUnit}^{rep}$. In some cases, the UE may first modify $N_{rep}^{PUCCH}$ to be a threshold value (e.g., a threshold number of repetitions) before modifying $M_{nominalUnit}^{rep}$. As an example, the threshold value may be equal to 1 (e.g., the threshold number of repetitions is one repetition); thus, the UE may modify $N_{rep}^{PUCCH}$, and if $N_{rep}^{PUCCH}=1$, the UE may then modify $M_{nominalUnit}^{rep}$.

In some cases, the UE may additionally or alternatively modify a total number of nominal units over which the PUCCH transmission 405 is repeated. For instance, the UE may modify the total number of nominal units to be a minimum total number (e.g., $Total_{min}$). Put another way, the UE may modify the total number of nominal units such that $Total_{min} = N_{rep}^{PUCCH} \cdot M_{nominalUnit}^{rep}$). The UE may adjust the total number of nominal units based on the UCI payload size and the maximum coding rate. However, the modified total number of nominal units may be different from an integer multiple of a maximum number of respective time intervals within each repetition, e.g., $Total_{min}$ may not be an integer multiple of $M_{nominalUnit}^{rep}$. For instance, in the first example of FIG. 4, the total number of nominal units for PUCCH transmission 405 is equal to 8, and the maximum value of $M_{nominalUnit}^{rep}$ may be equal to 2. The UE may adjust the total number of nominal units such that the total number of nominal units is different from an integer multiple of $M_{nominalUnit}^{rep}$ (e.g., 2). For example, the UE may adjust the total number of nominal units to be 5, which is not an integer multiple of 2.

The UE may modify or adjust other terms in Equation 3 as long as Equation 3 remains satisfied. For example, the UE may adjust the total UCI payload size based on a number (e.g., a maximum) of time intervals (e.g., nominal units) configured for the PUCCH repetitions 410. The number of time intervals may be equal to the product of the maximum values of $N_{rep}^{PUCCH}$ and $M_{nominalUnit}^{rep}$ (e.g., $N_{rep}^{PUCCH} \cdot M_{nominalUnit}^{rep}$). If the total UCI payload size is greater than Equation 3, where the values of $N_{rep}^{PUCCH}$ and $M_{nominalUnit}^{rep}$ in Equation 3 are equal to the maximum values of $N_{rep}^{PUCCH}$ and $M_{nominalUnit}^{rep}$, the UE may adjust the total UCI payload size by determining to exclude (e.g., dropping) portions of the CSI of the UCI (e.g., such that the value of $O_{UCI}$ is reduced) until Equation 3 is satisfied. In some cases, the UE may omit CSI according to a priority of the CSI. For instance, the UE may first omit CSI-part2 reports (e.g., partial or full reports) until Equation 3 is satisfied. If the UE omits all existing CSI-part2 reports but Equation 3 is still unsatisfied, the UE may omit CSI-part1 reports according to priority. Put another way, the UE may exclude CSI portions until the total UCI payload size associated with a number $N^{reported}$ CSI reports satisfies Equation 3, and the total UCI payload size associated with $N^{reported}+1$ CSI reports is higher than $N^{reported}$.

In some examples, the UE may determine minimum values for $N_{rep}^{PUCCH}$ and $M_{nominalUnit}^{rep}$ (e.g., $N_{rep,min}^{PUCCH}$ and $M_{nominalUnit,min}^{rep}$) based on a rank value. For instance, the UE may determine $N_{rep,min}^{PUCCH}$ and/or $M_{nominalUnit}^{rep}$ based on a rank value being equal to 1. The UE may further determine a payload size of the CSI included in the UCI based on the rank value.

In some cases, the UE may determine repetition configurations. For instance, the UE may determine a first repetition configuration of a maximum number of PUCCH repetitions 410 (i.e., a maximum value of $N_{rep}^{PUCCH}$) and a second repetition configuration of a maximum number of nominal units within each PUCCH repetition 410 (e.g., a maximum value of $M_{nominalUnit}^{rep}$). The first repetition configuration and the second repetition configuration may be configured per uplink control channel resource (e.g., PUCCH resource), per uplink control channel format (e.g., PUCCH format), or some combination thereof. In some examples, the base station may configure the first repetition configuration and the second repetition configuration. The UE may modify $N_{rep}^{PUCCH}$ and $M_{nominalUnit}^{rep}$ based on the first and second repetition configurations.

Once the UE has modified $N_{rep}^{PUCCH}$, $M_{nominalUnit}^{rep}$, or both, as well as any other parameters, according to the techniques described herein, the UE may map encoded bits of the UCI to resource elements of the adjusted set of resources to be used for transmitting the PUCCH repetitions 410. The encoded bits may be continuously mapped over the respective time intervals within each PUCCH repetition 410. For instance, in the first example of FIG. 4, the UE may continuously map encoded bits of the UCI over both nominal units of each PUCCH repetition 410. The UE may transmit the PUCCH repetitions 410 in the adjusted set of resources based on the parameters.

The base station may receive the PUCCH repetitions 410 on the adjusted set of resources. For instance, the base station may receive PUCCH repetitions 410 in a minimum number of repetitions (e.g., $N_{rep,min}^{PUCCH}$ in a threshold number of repetitions, in a minimum number of respective slots (e.g., $M_{nominalUnit,min}^{rep}$), in a modified number of respective nominal units, or some combination thereof. In some cases, the base station may also determine a CSI payload size, for instance, based on a rank value being equal to 1. The base station may decode the received PUCCH repetitions 410 based on the parameters and, in some examples, based on encoded bits that are continuously mapped over the respective slots within each PUCCH repetition 410.

Figure 5:
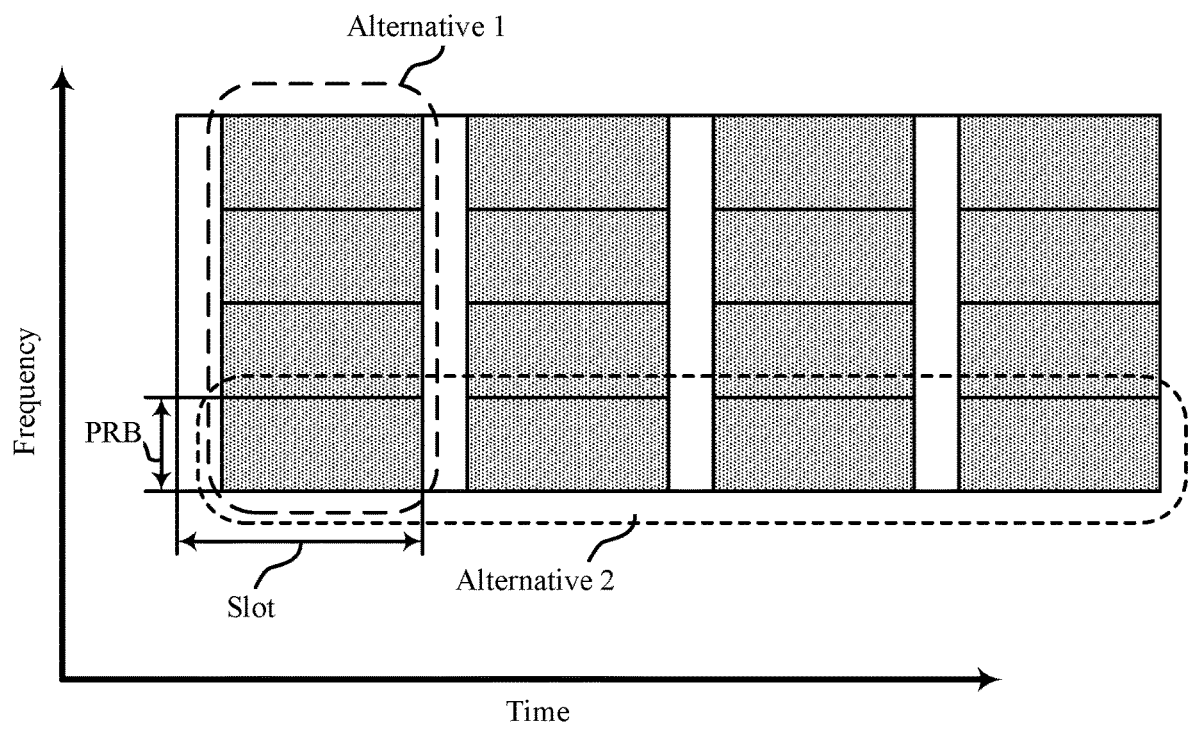
FIG. 5 illustrates an example of resource configurations that support that supports multi-level time-domain scalable uplink channel resources in accordance with aspects of the present disclosure.

FIG. 5 illustrates an example of a resource configuration 500 that supports multi-level time-domain scalable uplink channel resources in accordance with aspects of the present disclosure. For example, the resource configuration 500 may represent configurations of resources used by a base station (e.g., a base station 105 as described herein) and a UE (e.g., a UE 115 as described herein) to communicate control information (e.g., UCI) via an uplink control channel (e.g., a PUCCH).

Resource configuration 500 may include time resources and frequency resources. As illustrated, each time interval in resource configuration 500 may be a slot, and each slot may include a number (e.g., 4) of PRBs. Each PRB may include a number of consecutive subcarriers. Thus, a UE may transmit PUCCH repetitions during a slot and on a PRB as illustrated by resource configuration 500. That is, a UE may identify a set of resources (e.g., a slot and a number of PRBs) of resource configuration 500 and may adjust the set of resources based on modifying parameters according to the techniques described herein (e.g., with reference to FIGS. 3 and 4).

A UE transmitting PUCCH repetitions may adjust the set of resources in the time domain, in the frequency domain, or both. For example, the UE may adjust the set of resources in the time domain by modifying the number of PUCCH repetitions, the number of respective time intervals (e.g., slots) within each PUCCH repetition, or both, e.g., as described with reference to FIGS. 3 and 4. The UE may additionally modify the set of resources in the frequency domain. As an example, the UE may modify a number of PRBs used to transmit a PUCCH repetition. The number of PRBs may be modified based on the PUCCH format.

The UE may modify the set of resources in the frequency domain, for instance, based on the payload size of the UCI and the coding rate (e.g., maximum coding rate). Using the example of Equation 2, the UE may modify the value of $N_{RB}^{PUCCH}$ such that Equation 2 is satisfied. Similarly, in the example of Equation 3, the UE may modify the value of $N_{RB}^{PUCCH}$ such that Equation 3 is satisfied. As an example using FIG. 5, the UE may reduce the number of PRBs in a slot from four to three, or may increase the number of PRBs from four to five, etc.

In some examples, the UE may adjust the set of resources in the time domain prior to adjusting the set of resources in the frequency domain. In the example of Equation 2, the UE may first modify $N_{rep}^{PUCCH}$ and $M_{slot}^{rep}$ (or $M_{nominalUnit}^{rep}$ in the example of Equation 3), and may then modify $N_{RB}^{PUCCH}$. As an example, the UE may modify $N_{rep}^{PUCCH}$ to be a minimum value. Once $N_{rep}^{PUCCH}$ is at a minimum value, the UE may determine to modify $N_{RB}^{PUCCH}$.

Alternatively, the UE may adjust the set of resources in the frequency domain prior to adjusting the set of resources in the time domain. In the example of Equation 2, the UE may modify $N_{RB}^{PUCCH}$ before modifying $N_{rep}^{PUCCH}$ and $M_{slot}^{rep}$ (or $M_{nominalUnit}^{rep}$ in the example of Equation 3). As an example, the UE may modify $N_{RB}^{PUCCH}$; once $N_{RB}^{PUCCH}$ has reached a minimum value, the UE may adjust $N_{rep}^{PUCCH}$ and/or $M_{slot}^{rep}$.

The UE may transmit the PUCCH repetitions on the adjusted set of time and frequency resources based on the modified parameters. The base station may receive the PUCCH repetitions on the adjusted resources.

Figure 6:
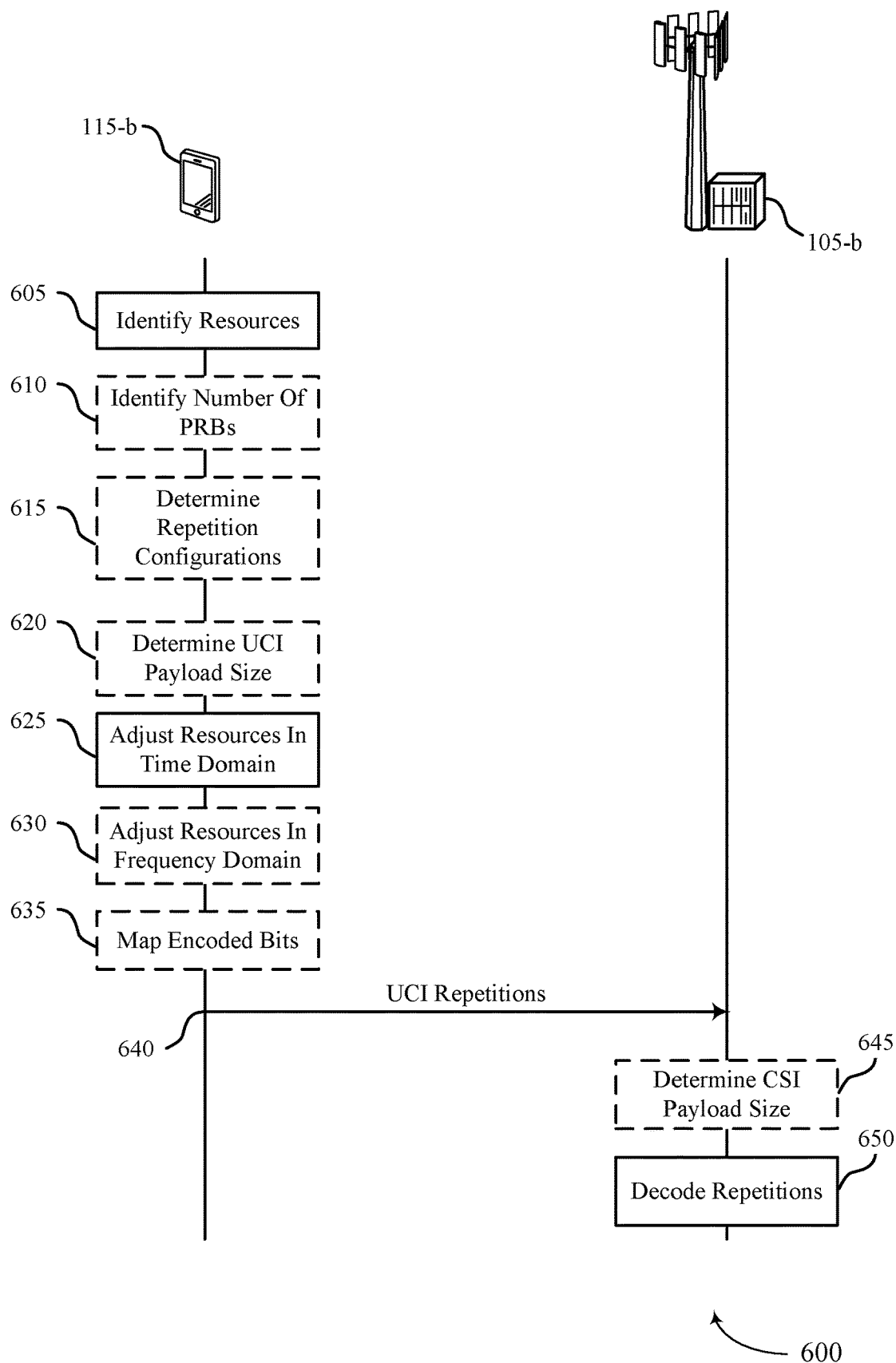
FIG. 6 illustrates an example of a process flow in a system that supports multi-level time-domain scalable uplink channel resources in accordance with aspects of the present disclosure.

FIG. 6 illustrates an example of a process flow 600 in a system that supports multi-level time-domain scalable uplink channel resources in accordance with aspects of the present disclosure. In some examples, the process flow 600 may implement aspects of wireless communication systems 100 or 200. For example, process flow 600 may include a base station 105-b and a UE 115-b, which may be examples of corresponding wireless devices as described herein. In the following description of the process flow 600, the operations between the UE 115-b and the base station 105-b may be transmitted in a different order than the exemplary order shown, or the operations performed by the UE 115-b and the base station 105-b may be performed in different orders or at different times. Certain operations may also be left out of the process flow 600, or other operations may be added to the process flow 600. It is to be understood that while the UE 115-b and the base station 105-b are shown performing operations of process flow 600, any wireless device may perform the operations shown.

At 605, the UE 115-b may identify one or more resources (e.g., a set of resources, such as time-domain resources, frequency-domain resources, or both) to be used for transmitting one or more repetitions of UCI over an uplink control channel (e.g., a PUCCH). The resources may be configured for the UE 115-a, for example, by the base station 105-b.

At 610, the UE 115-b may identify a fixed number of PRBs corresponding to the set of resources. The fixed number of PRBs may be preconfigured, configured via RRC signaling, or both.

At 615, the UE 115-b may identify a first repetition configuration of a maximum number of repetitions of the UCI and a second repetition configuration of a maximum number of respective time intervals within each repetition of the UCI. The first repetition configuration and the second repetition configuration may be configured per uplink control channel resource (e.g., PUCCH resource), per uplink control channel format (e.g., PUCCH format), or some combination thereof.

In some examples, the UE 115-b may be configured with the maximum number of repetitions (e.g., the first repetition configuration) and the maximum number of respective time intervals within each repetition (e.g., the second repetition configuration) by the base station 105-b.

At 620, the UE 115-a may determine a payload size of the UCI. The UCI payload size may correspond to a value of $O_{UCI}$ as described with reference to FIGS. 2-5. In some examples, at 620, the UE 115-a may additionally or alternatively determine a payload size of CSI of the UCI. In such examples, the payload size of CSI may be determined on a rank value (e.g., a MIMO rank value). For instance, the rank value may be equal to one, and the UE 115-b may determine the payload size of CSI accordingly.

In some examples, the UE 115-b may optionally determine to exclude a portion of CSI from the UCI repetitions based on the UCI payload size. For example, the UE 115-b may be configured with a number of time intervals for the UCI repetitions. The number of time intervals may be a product of a maximum number of repetitions of the UCI (e.g., the first repetition configuration identified at 615) and a maximum number of respective time intervals within each repetition (e.g., the second repetition configuration identified at 615). The UE 115-b may exclude the portion of CSI based on the number of time intervals. In some cases, the UE 115-b may exclude the portion of CSI based on a priority associated with the portion of CSI.

At 625, the UE 115-b may adjust the set of resources in the time domain based on the UCI payload size, the CSI payload size, a coding rate, or some combination thereof. The UE 115-b may adjust the set of resources by modifying a number of repetitions of the UCI, a number of respective time intervals (e.g., slots) within each repetition of the UCI, or both. In some examples, the number of repetitions of the UCI or the number of respective time intervals may be a preconfigured value, and the UE 115-b may modify the value that is not preconfigured. For example, the number of repetitions may be preconfigured, and the UE 115-b may modify the number of respective time intervals, e.g., to be equal to a minimum number of time intervals. Alternatively, the number of respective time intervals may be reconfigured, and the UE 115-b may adjust the number of repetitions of the UCI to be a minimum number of repetitions. In some examples, the UE 115-b may determine a minimum number of repetitions or a minimum number of time intervals based on rank value, e.g., a rank value equal to one.

In some examples, the UE 115-b may modify the number of repetitions to be equal to a threshold number of repetitions, and may then modify the number of respective time intervals within each repetition based on the UCI payload size (e.g., determined at 620) and the coding rate. In some cases, the threshold number of repetitions may be equal to one repetition.

The UE 115-b may, in some cases, modify a total number of respective time intervals for the UCI repetitions, such that the modified total number of respective time intervals is different from an integer multiple of a maximum number of respective time intervals within each repetition. That is, the UE 115-b may identify a maximum number of respective time intervals within each repetition. The UE 115-b may modify the total number of time intervals used to transmit the repetitions, where the modified total number is not an integer multiple of the identified maximum number. The total number may be modified based on the UCI payload size (e.g., determined at 620) and the coding rate.

In some cases, if the UE 115-b determined a first and/or a second repetition configuration at 615, the UE 115-b may modify the number of repetitions and the number of respective tie intervals based on the first repetition configuration, the second repetition configuration, or both.

At 630, in some examples, the UE 115-b may adjust the set of resources in the frequency domain based on the UCI payload size and the coding rate. For instance, the UE 115-b may modify a number of PRBs based on a format of the uplink control channel. As an example, the uplink control channel may be a PUCCH corresponding to PF3, where PF3 supports 1 to 16 PRBs except for 7, 11, 13, or 14 PRBs. The UE 115-b may modify the number of PRBs to be a number supported by PF3.

In some cases, the UE 115-b may adjust the set of resources in the frequency domain after adjusting the set of resources in the time domain, e.g., as illustrated by process flow 600. However, in other cases, the UE 115-b may adjust the set of resources in the frequency domain prior to adjusting the set of resources in the time domain; e.g., the UE 115-b may perform the operations of 630 before performing the operations of 625.

At 635, the UE 115-b may map encoded bits of the UCI to resource elements of the adjusted set of resources. The encoded bits may be continuously mapped over the respective time intervals within each repetition of the UCI. For instance, if each repetition includes three time intervals, the UE 115-b may continuously map the encoded bits of the UCI over all three time intervals.

At 640, the UE 115-b may transmit, and the base station 105-b may receive (e.g., via the uplink control channel), the one or more repetitions (e.g., time-domain repetitions) of the UCI. The base station 105-b may receive the one or more repetitions on an adjusted set of resources based on the UCI payload size and the coding rate. The adjusted set of resources may include the number of repetitions of the UCI (e.g., as modified at 625) and the number of respective time intervals within each repetition (e.g., as modified at 625). In some examples, the adjusted set of resources may be based on the configurations identified by the UE 115-b, e.g., at 615. In some cases, the modified number of respective time intervals may be different from an integer multiple of a maximum number of respective time intervals within each repetition.

In some examples, the base station 105-b may receive the one or more repetitions in a minimum number of repetitions where the number of respective time intervals within each repetition is a preconfigured value. Alternatively, the base station 105-b may receive the one or more repetitions in a minimum number of respective time intervals within each repetition, where the number of repetitions is a preconfigured value.

In some cases, the base station 105-*b* may receive the one or more repetitions in a threshold number of repetitions (e.g., one repetition) and in a minimum number of respective time intervals within each repetition, for instance, based on the UCI payload size and the coding rate. In some examples, the base station 105-*b* may receive the one or more repetitions in an adjusted set of frequency-domain resources, for instance, based on the UCI payload size and the coding rate.

At 645, the base station 105-*b* may determine a payload size of the CSI included in the UCI. The CSI payload size may be based on a rank value that is equal to one.

At 650, the base station 105-*b* may decode the one or more repetitions based on the number of repetitions of the UCI and the number of respective time intervals within each repetition. In some examples, the base station 105-*b* may decode the one or more repetitions based on encoded bits that are continuously mapped over the respective time intervals within each repetition, e.g., as mapped by the UE 115-*b* at 635.

Figure 7:
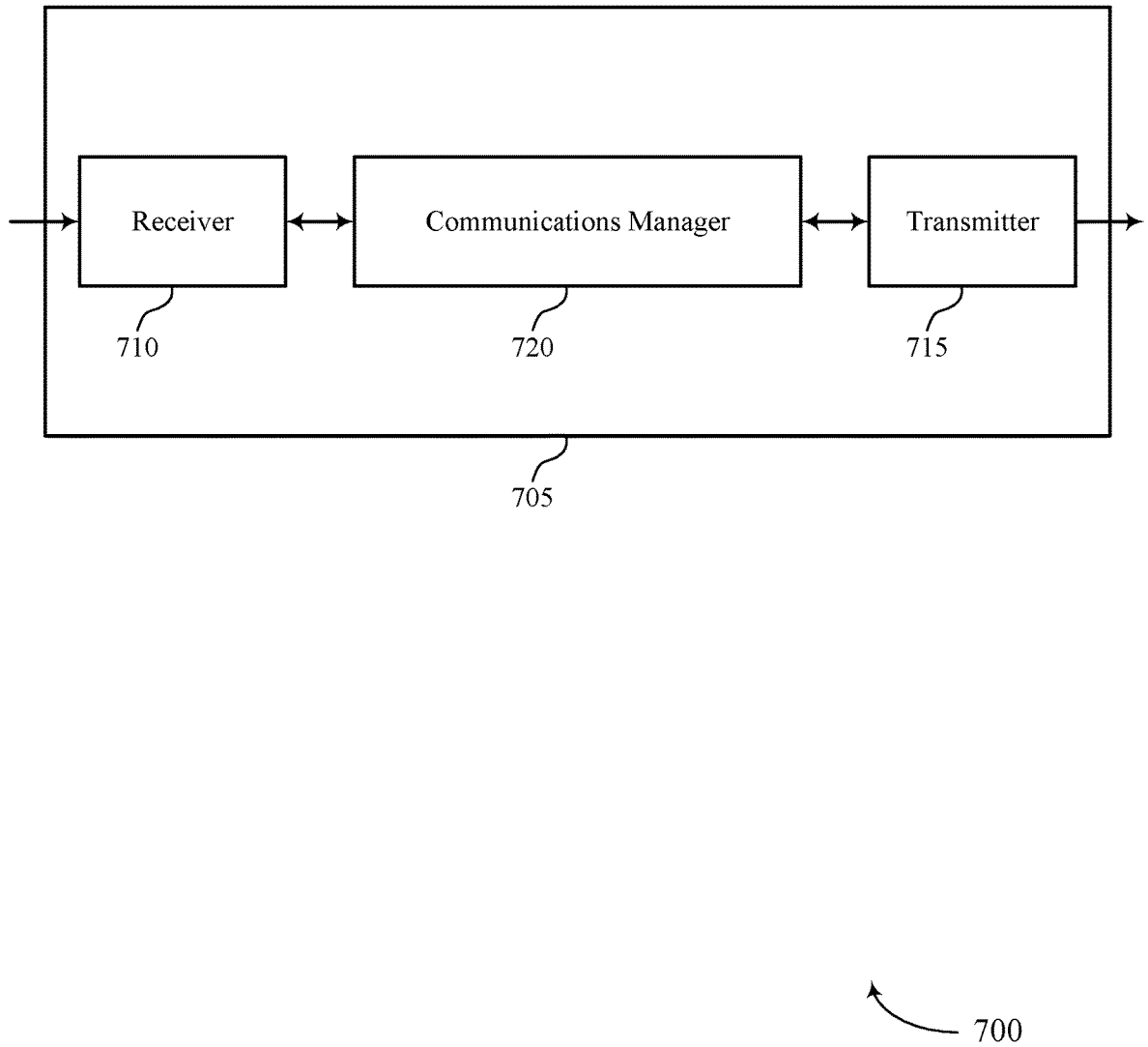
FIGS. 7 and 8 show block diagrams of devices that support multi-level time-domain scalable uplink channel resources in accordance with aspects of the present disclosure.

FIG. 7 shows a block diagram 700 of a device 705 that supports multi-level time-domain scalable uplink channel resources in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multi-level time-domain scalable uplink channel resources). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multi-level time-domain scalable uplink channel resources). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of multi-level time-domain scalable uplink channel resources as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for identifying a set of resources for transmitting one or more repetitions of uplink control information over an uplink control channel. The communications manager 720 may be configured as or otherwise support a means for adjusting the set of resources in a time domain based on a payload size of the uplink control information and a coding rate, where adjusting the set of resources includes modifying a number of repetitions of the uplink control information and a number of respective time intervals within each repetition of the uplink control information. The communications manager 720 may be configured as or otherwise support a means for transmitting the one or more repetitions of the uplink control information in the adjusted set of resources based on the number of repetitions of the uplink control information and the number of respective time intervals within each repetition.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for adjusting, at multiple levels, resources used to transmit PUCCH repetitions. Adjusting the resources to satisfy a maximum coding rate and a UCI size may enable the device 705 to achieve a relatively constant UCI transmission energy, thereby increasing reliability and efficiency, especially in scenarios where transmit power may be limited. Further, repeating PUCCH transmissions over multiple slots may increase gain at the device 705, such as IR coding gain.

Figure 8:
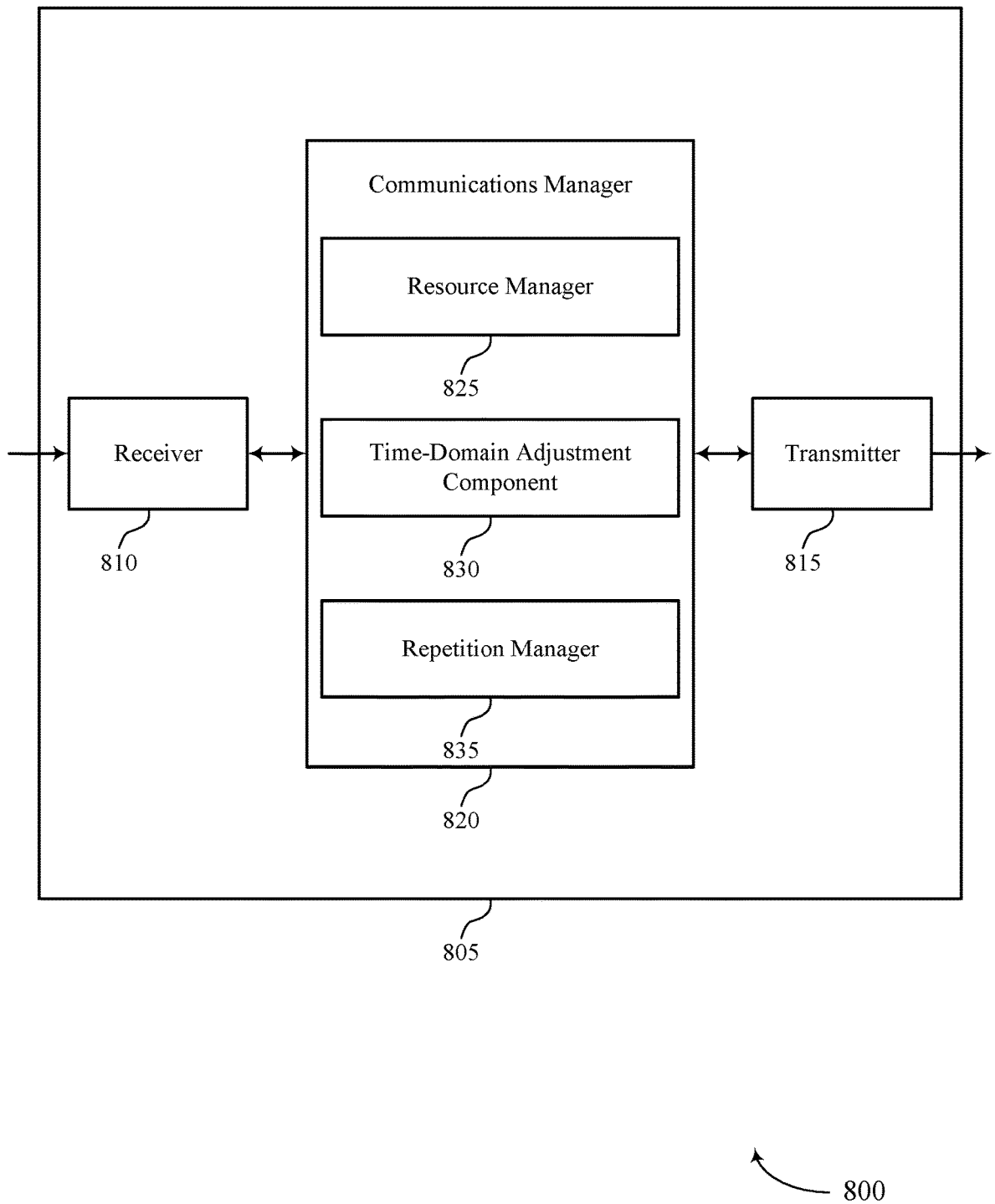

FIG. 8 shows a block diagram 800 of a device 805 that supports multi-level time-domain scalable uplink channel resources in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multi-level time-domain scalable uplink channel resources). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multi-level time-domain scalable uplink channel resources). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multi-level time-domain scalable uplink channel resources as described herein. For example, the communications manager 820 may include a resource manager 825, a time-domain adjustment component 830, a repetition manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The resource manager 825 may be configured as or otherwise support a means for identifying a set of resources for transmitting one or more repetitions of uplink control information over an uplink control channel. The time-domain adjustment component 830 may be configured as or otherwise support a means for adjusting the set of resources in a time domain based on a payload size of the uplink control information and a coding rate, where adjusting the set of resources includes modifying a number of repetitions of the uplink control information and a number of respective time intervals within each repetition of the uplink control information. The repetition manager 835 may be configured as or otherwise support a means for transmitting the one or more repetitions of the uplink control information in the adjusted set of resources based on the number of repetitions of the uplink control information and the number of respective time intervals within each repetition.

Figure 9:
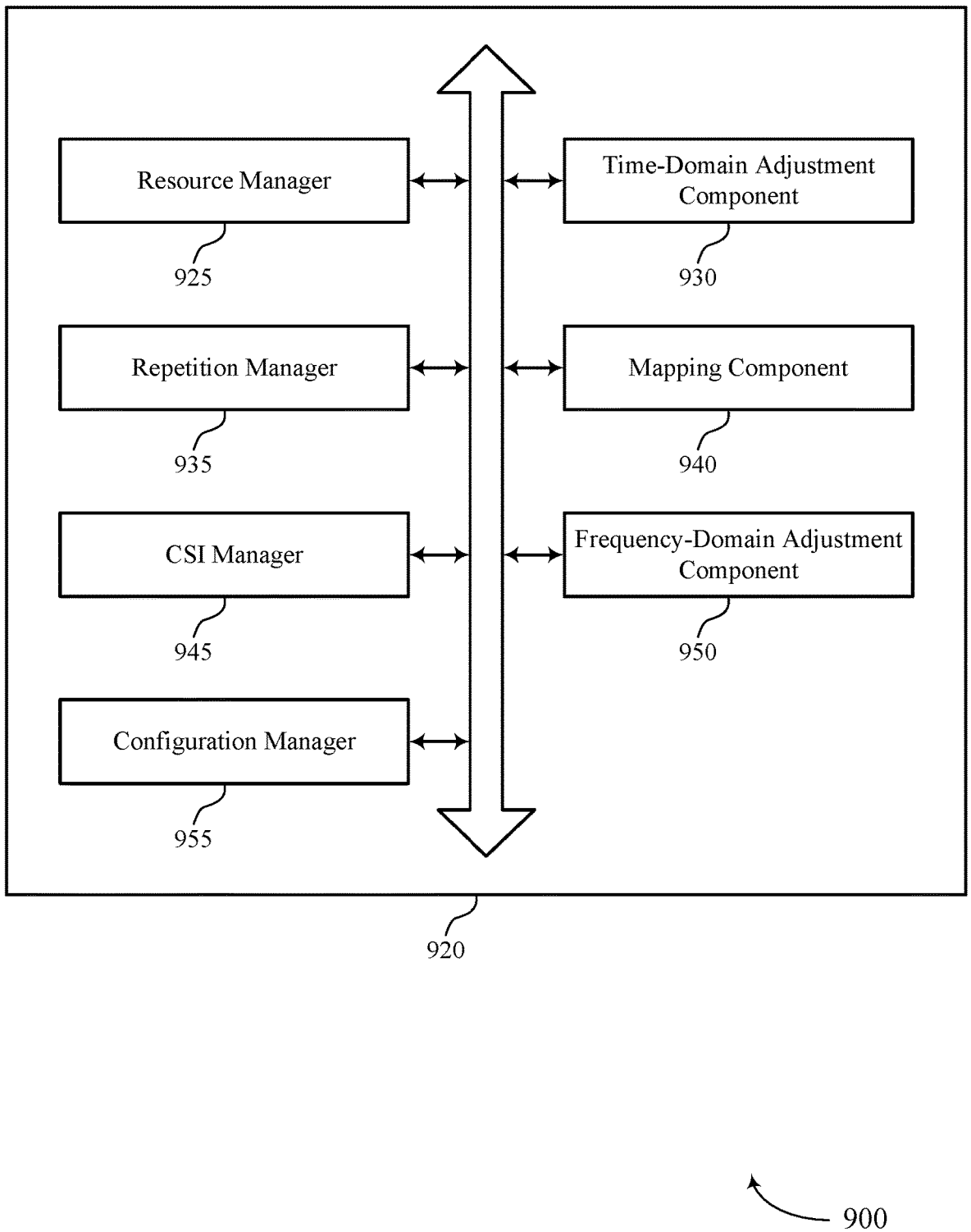
FIG. 9 shows a block diagram of a communications manager that supports multi-level time-domain scalable uplink channel resources in accordance with aspects of the present disclosure.

FIG. 9 shows a block diagram 900 of a communications manager 920 that supports multi-level time-domain scalable uplink channel resources in accordance with aspects of the present disclosure. The communications manager 920 may be an example of aspects of a communications manager 720, a communications manager 820, or both, as described herein. The communications manager 920, or various components thereof, may be an example of means for performing various aspects of multi-level time-domain scalable uplink channel resources as described herein. For example, the communications manager 920 may include a resource manager 925, a time-domain adjustment component 930, a repetition manager 935, a mapping component 940, a CSI manager 945, a frequency-domain adjustment component 950, a configuration manager 955, or any combination thereof. Each of these components may communicate, directly or indirectly, with one another (e.g., via one or more buses).

The communications manager 920 may support wireless communication at a UE in accordance with examples as disclosed herein. The resource manager 925 may be configured as or otherwise support a means for identifying a set of resources for transmitting one or more repetitions of uplink control information over an uplink control channel. The time-domain adjustment component 930 may be configured as or otherwise support a means for adjusting the set of resources in a time domain based on a payload size of the uplink control information and a coding rate, where adjusting the set of resources includes modifying a number of repetitions of the uplink control information and a number of respective time intervals within each repetition of the uplink control information. The repetition manager 935 may be configured as or otherwise support a means for transmitting the one or more repetitions of the uplink control information in the adjusted set of resources based on the number of repetitions of the uplink control information and the number of respective time intervals within each repetition.

In some examples, to support adjusting the set of resources, the time-domain adjustment component 930 may be configured as or otherwise support a means for modifying the number of repetitions of the uplink control information to be equal to a minimum number of repetitions, where the number of respective time intervals within each repetition includes a preconfigured value.

In some examples, to support adjusting the set of resources, the time-domain adjustment component 930 may be configured as or otherwise support a means for modifying the number of respective time intervals within each repetition to be equal to a minimum number of time intervals, where the number of repetitions of the uplink control information includes a preconfigured value.

In some examples, to support adjusting the set of resources, the time-domain adjustment component 930 may be configured as or otherwise support a means for modifying the number of repetitions of the uplink control information to be equal to a threshold number of repetitions. In some examples, to support adjusting the set of resources, the time-domain adjustment component 930 may be configured as or otherwise support a means for modifying the number of respective time intervals within each repetition based on the payload size of the uplink control information and the coding rate. In some examples, the threshold number of repetitions includes one repetition.

In some examples, to support adjusting the set of resources, the time-domain adjustment component 930 may be configured as or otherwise support a means for modifying a total number of respective time intervals for the one or more repetitions of the uplink control information based on the payload size of the uplink control information and the coding rate, where the modified total number of respective time intervals is different from an integer multiple of a maximum number of respective time intervals within each repetition.

In some examples, the mapping component 940 may be configured as or otherwise support a means for mapping encoded bits of the uplink control information to resource elements of the adjusted set of resources, where the encoded bits are continuously mapped over the respective time intervals within each repetition of the uplink control information.

In some examples, the resource manager 925 may be configured as or otherwise support a means for identifying a fixed number of physical resource blocks corresponding to the set of resources, where the fixed number of physical resource blocks are preconfigured, configured via radio resource control signaling, or both.

In some examples, the CSI manager 945 may be configured as or otherwise support a means for determining to exclude a portion of channel state information from the one or more repetitions of the uplink control information based on the payload size of the uplink control information, where excluding the portion of the channel state information is based on a number of time intervals configured for the one or more repetitions of the uplink control information. In some examples, the number of time intervals configured for the one or more repetitions includes a product of a maximum number of repetitions of the uplink control information and a maximum number of respective time intervals within each repetition.

In some examples, the frequency-domain adjustment component 950 may be configured as or otherwise support a means for adjusting the set of resources in a frequency domain based on the payload size of the uplink control information and the coding rate, where adjusting the set of resources in the frequency domain includes modifying a number of physical resource blocks based on a format of the uplink control channel. In some examples, the set of resources are adjusted in the frequency domain prior to adjusting the set of resources in the time domain. In some examples, the set of resources are adjusted in the frequency domain after adjusting the set of resources in the time domain.

In some examples, the repetition manager 935 may be configured as or otherwise support a means for determining a minimum number of repetitions of the uplink control information based on a rank value equal to one, where a payload size of channel state information is determined based on the rank value.

In some examples, the repetition manager 935 may be configured as or otherwise support a means for determining a minimum number of time intervals within each repetition of the uplink control information based on a rank value equal to one, where a payload size of channel state information is determined based on the rank value.

In some examples, the configuration manager 955 may be configured as or otherwise support a means for determining a first repetition configuration of a maximum number of repetitions of the uplink control information and a second repetition configuration of a maximum number of respective time intervals within each repetition of the uplink control information, where modifying the number of repetitions of the uplink control information and the number of respective time intervals within each repetition of the uplink control information is based on the first repetition configuration and the second repetition configuration.

In some examples, the first repetition configuration and the second repetition configuration are configured per uplink control channel resource, per uplink control channel format, or any combination thereof. In some examples, the respective time intervals within each repetition includes a slot. In other examples, the respective time intervals within each repetition may include a TTI or duration that is different from a slot.

Figure 10:
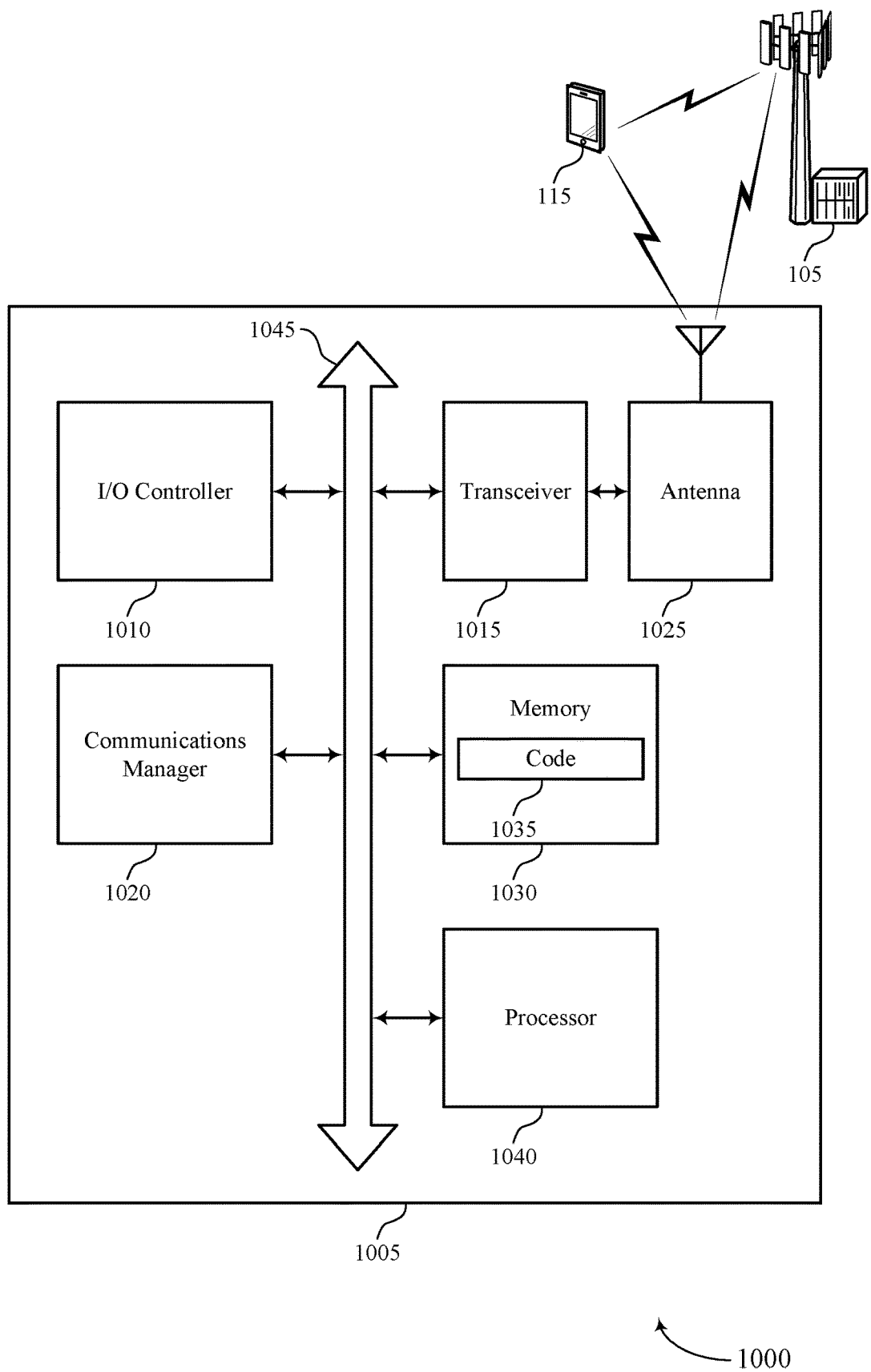
FIG. 10 shows a diagram of a system including a device that supports multi-level time-domain scalable uplink channel resources in accordance with aspects of the present disclosure.

FIG. 10 shows a diagram of a system 1000 including a device 1005 that supports multi-level time-domain scalable uplink channel resources in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multi-level time-domain scalable uplink channel resources). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for identifying a set of resources for transmitting one or more repetitions of uplink control information over an uplink control channel. The communications manager 1020 may be configured as or otherwise support a means for adjusting the set of resources in a time domain based on a payload size of the uplink control information and a coding rate, where adjusting the set of resources includes modifying a number of repetitions of the uplink control information and a number of respective time intervals within each repetition of the uplink control information. The communications manager 1020 may be configured as or otherwise support a means for transmitting the one or more repetitions of the uplink control information in the adjusted set of resources based on the number of repetitions of the uplink control information and the number of respective time intervals within each repetition.

By including or configuring the communications manager 1020 in accordance with examples as described herein, the device 1005 may support techniques for adjusting, at multiple levels, resources used to transmit PUCCH repetitions. For instance, increasing a number of PUCCH repetitions and/or a number of slots within each repetition may provide enhanced uplink coverage and increased gains for the device 1005, thereby increasing communications reliability and efficiency.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of multi-level time-domain scalable uplink channel resources as described herein, or the processor 1040 and the memory 1030 may be otherwise configured to perform or support such operations.

Figure 11:
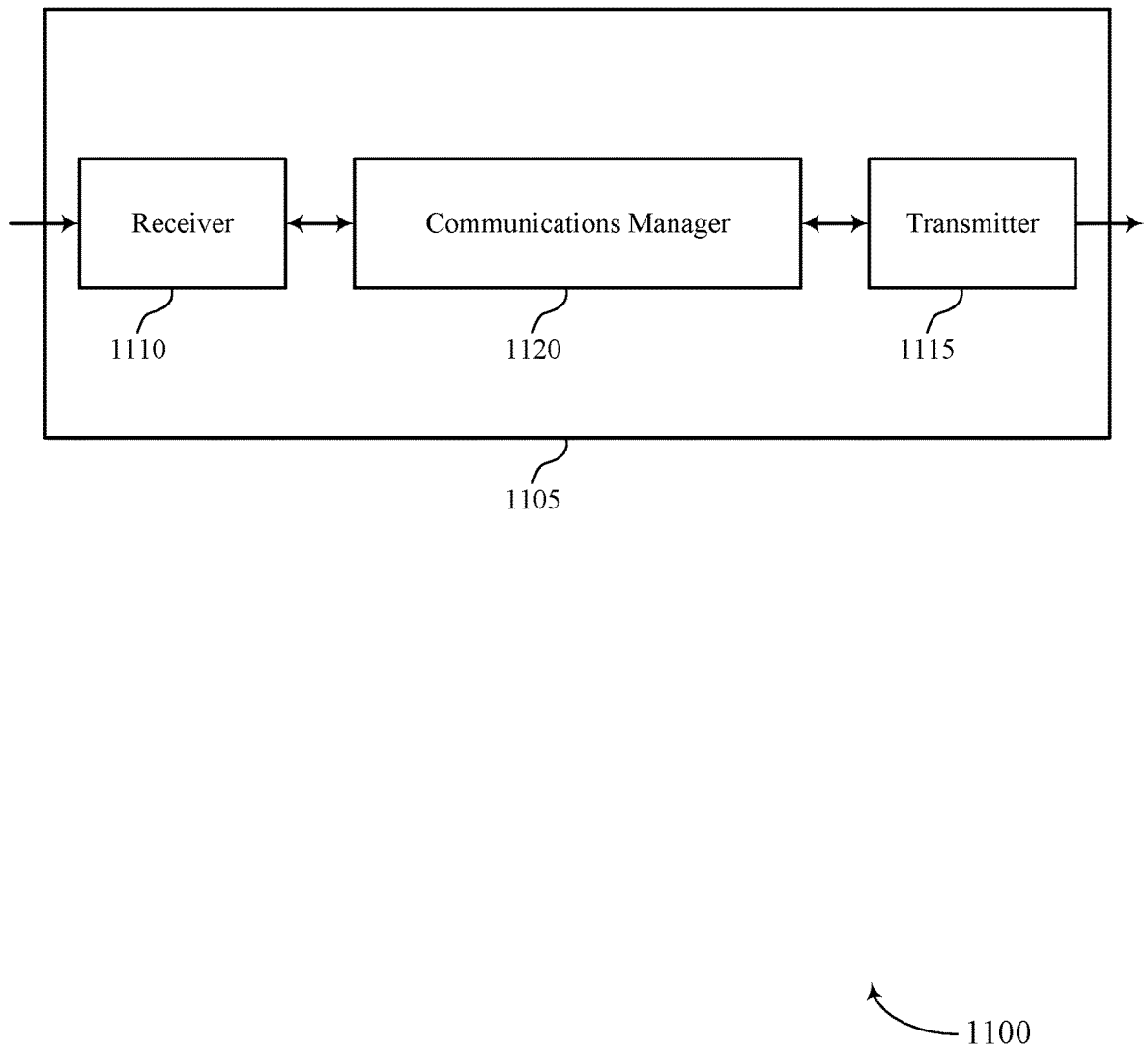
FIGS. 11 and 12 show block diagrams of devices that support multi-level time-domain scalable uplink channel resources in accordance with aspects of the present disclosure.

FIG. 11 shows a block diagram 1100 of a device 1105 that supports multi-level time-domain scalable uplink channel resources in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multi-level time-domain scalable uplink channel resources). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multi-level time-domain scalable uplink channel resources). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of multi-level time-domain scalable uplink channel resources as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for receiving, from a UE, one or more time-domain repetitions of uplink control information over an uplink control channel, the one or more time-domain repetitions being received on an adjusted set of resources based on a payload size of the uplink control information and a coding rate, where the adjusted set of resources include a number of repetitions of the uplink control information and a number of respective time intervals within each repetition of the uplink control information. The communications manager 1120 may be configured as or otherwise support a means for decoding the one or more time-domain repetitions of the uplink control information based on the number of repetitions of the uplink control information and the number of respective time intervals within each repetition.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for receiving one or more PUCCH repetitions on adjusted resources, such as an adjusted number of repetitions or an adjusted number of slots within each repetition. Adjusting the resources may provide increased communication efficiency for the device 1105, for example, if fewer resources or repetitions are used.

Figure 12:
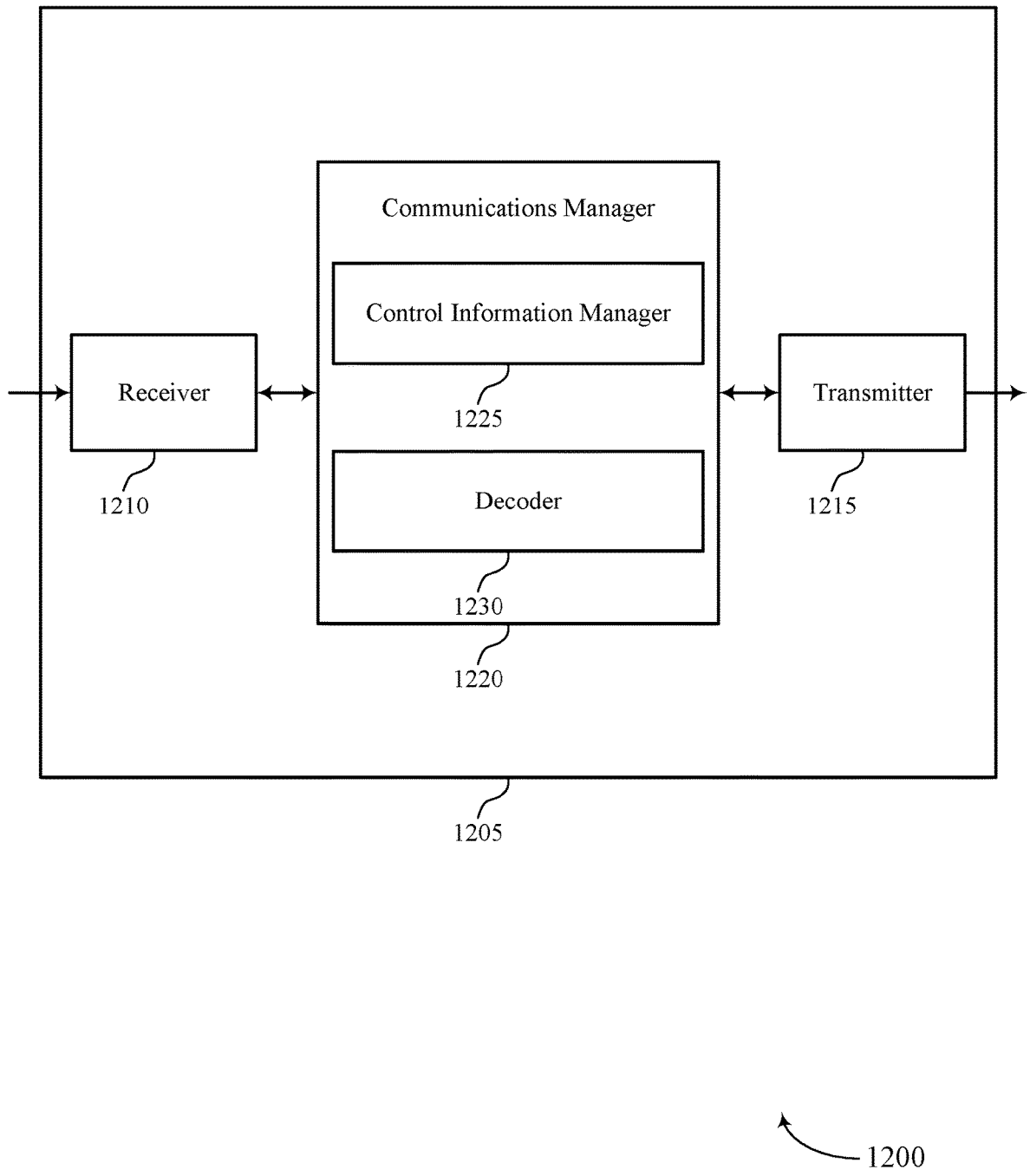

FIG. 12 shows a block diagram 1200 of a device 1205 that supports multi-level time-domain scalable uplink channel resources in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to multi-level time-domain scalable uplink channel resources). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to multi-level time-domain scalable uplink channel resources). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of multi-level time-domain scalable uplink channel resources as described herein. For example, the communications manager 1220 may include a control information manager 1225 a decoder 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The control information manager 1225 may be configured as or otherwise support a means for receiving, from a UE, one or more time-domain repetitions of uplink control information over an uplink control channel, the one or more time-domain repetitions being received on an adjusted set of resources based on a payload size of the uplink control information and a coding rate, where the adjusted set of resources include a number of repetitions of the uplink control information and a number of respective time intervals within each repetition of the uplink control information. The decoder 1230 may be configured as or otherwise support a means for decoding the one or more time-domain repetitions of the uplink control information based on the number of repetitions of the uplink control information and the number of respective time intervals within each repetition.

Figure 13:
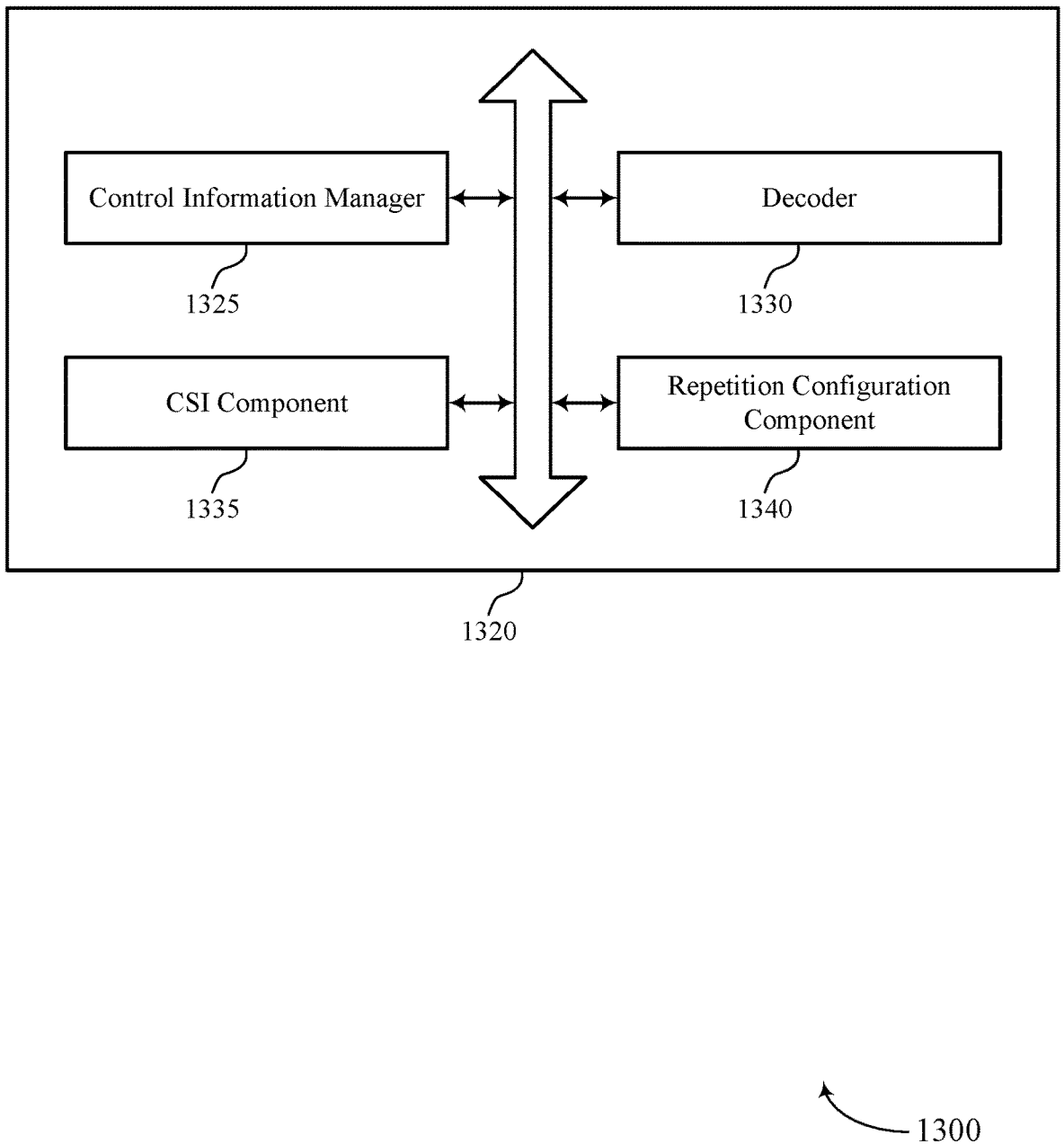
FIG. 13 shows a block diagram of a communications manager that supports multi-level time-domain scalable uplink channel resources in accordance with aspects of the present disclosure.

FIG. 13 shows a block diagram 1300 of a communications manager 1320 that supports multi-level time-domain scalable uplink channel resources in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of multi-level time-domain scalable uplink channel resources as described herein. For example, the communications manager 1320 may include a control information manager 1325, a decoder 1330, a CSI component 1335, a repetition configuration component 1340, or any combination thereof. Each of these components may communicate, directly or indirectly, with one another (e.g., via one or more buses).

The communications manager 1320 may support wireless communication at a base station in accordance with examples as disclosed herein. The control information manager 1325 may be configured as or otherwise support a means for receiving, from a UE, one or more time-domain repetitions of uplink control information over an uplink control channel, the one or more time-domain repetitions being received on an adjusted set of resources based on a payload size of the uplink control information and a coding rate, where the adjusted set of resources include a number of repetitions of the uplink control information and a number of respective time intervals within each repetition of the uplink control information. The decoder 1330 may be configured as or otherwise support a means for decoding the one or more time-domain repetitions of the uplink control information based on the number of repetitions of the uplink control information and the number of respective time intervals within each repetition.

In some examples, to support receiving the one or more time-domain repetitions of the uplink control information, the control information manager 1325 may be configured as or otherwise support a means for receiving the one or more time-domain repetitions of the uplink control information in a minimum number of repetitions of the uplink control information, where the number of respective time intervals within each repetition includes a preconfigured value.

In some examples, to support receiving the one or more time-domain repetitions of the uplink control information, the control information manager 1325 may be configured as or otherwise support a means for receiving the one or more time-domain repetitions of the uplink control information in a minimum number of respective time intervals within each repetition of the uplink control information, where the number of repetitions of the uplink control information includes a preconfigured value.

In some examples, to support receiving the one or more time-domain repetitions of the uplink control information, the control information manager 1325 may be configured as or otherwise support a means for receiving the one or more time-domain repetitions of the uplink control information in a threshold number of repetitions of the uplink control information and in a minimum number of respective time intervals within each repetition based on the payload size of the uplink control information and the coding rate. In some examples, the threshold number of repetitions of the uplink control information includes one repetition.

In some examples, to support receiving the one or more time-domain repetitions of the uplink control information, the control information manager 1325 may be configured as or otherwise support a means for receiving the one or more time-domain repetitions of the uplink control information in a modified number of respective time intervals, where the modified number of repetitions of the uplink control information is different from an integer multiple of a maximum number of respective time intervals within each repetition.

In some examples, to support decoding the one or more time-domain repetitions of the uplink control information, the decoder 1330 may be configured as or otherwise support a means for decoding the one or more time-domain repetitions of the uplink control information based on encoded bits that are continuously mapped over the respective time intervals within each repetition of the uplink control information.

In some examples, the CSI component 1335 may be configured as or otherwise support a means for determining a payload size of channel state information included in the uplink control information, where the payload size of the channel state information is based on a rank value equal to one.

In some examples, to support receiving the one or more time-domain repetitions of the uplink control information, the control information manager 1325 may be configured as or otherwise support a means for receiving the one or more time-domain repetitions of the uplink control information in an adjusted set of frequency-domain resources based on the payload size of the uplink control information and the coding rate.

In some examples, the repetition configuration component 1340 may be configured as or otherwise support a means for configuring a maximum number of repetitions of the uplink control information. In some examples, the repetition configuration component 1340 may be configured as or other- wise support a means for configuring a maximum number of respective time intervals within each repetition of the uplink control information, the number of repetitions of the uplink control information and the number of respective time intervals within each repetition of the uplink control information is based on the configurations.

Figure 14:
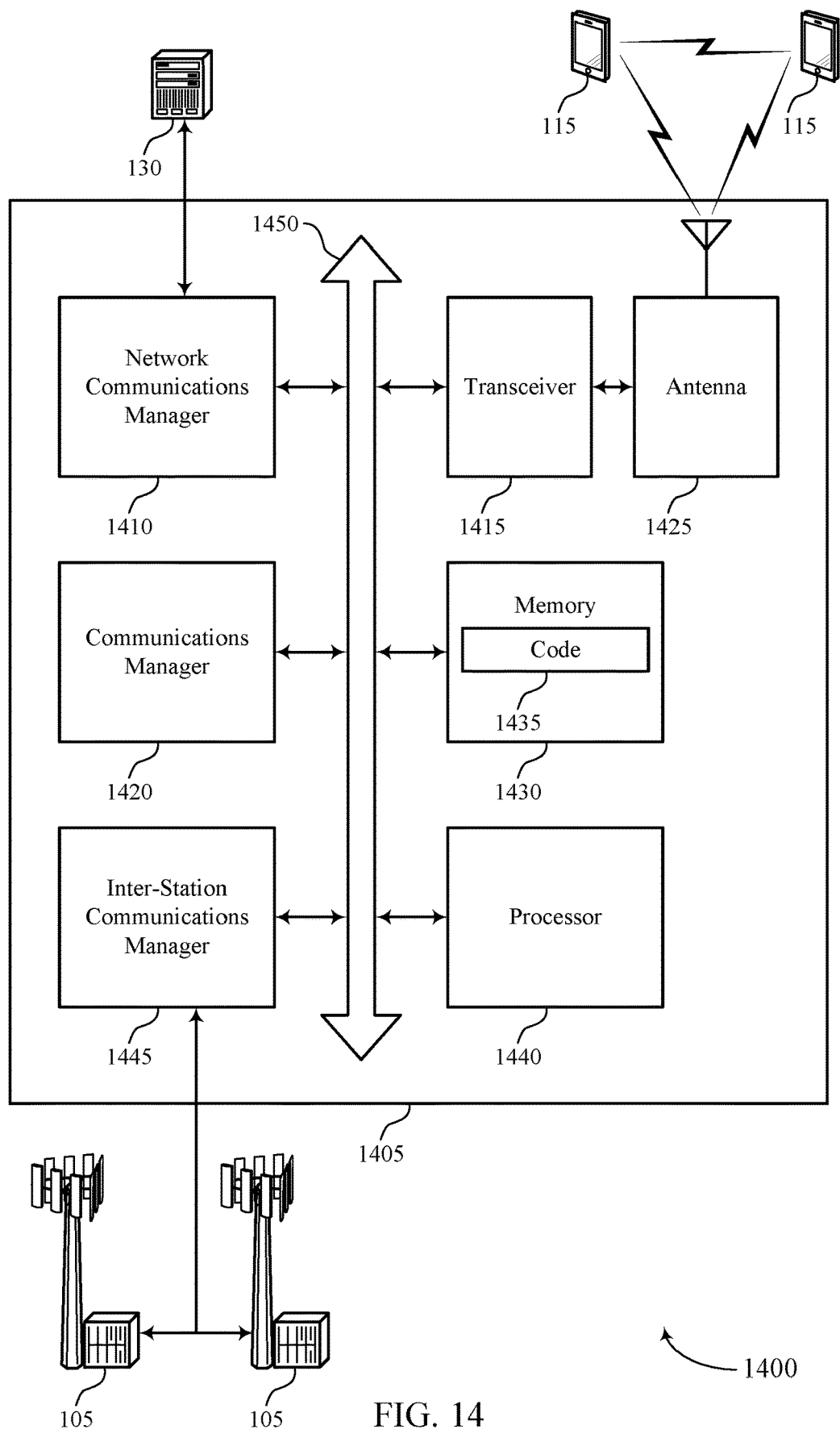
FIG. 14 shows a diagram of a system including a device that supports multi-level time-domain scalable uplink channel resources in accordance with aspects of the present disclosure.

FIG. 14 shows a diagram of a system 1400 including a device 1405 that supports multi-level time-domain scalable uplink channel resources in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting multi-level time-domain scalable uplink channel resources). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for receiving, from a UE, one or more time-domain repetitions of uplink control information over an uplink control channel, the one or more time-domain repetitions being received on an adjusted set of resources based on a payload size of the uplink control information and a coding rate, where the adjusted set of resources include a number of repetitions of the uplink control information and a number of respective time intervals within each repetition of the uplink control information. The communications manager 1420 may be configured as or otherwise support a means for decoding the one or more time-domain repetitions of the uplink control information based on the number of repetitions of the uplink control information and the number of respective time intervals within each repetition.

By including or configuring the communications manager 1420 in accordance with examples as described herein, the device 1405 may support techniques for receiving one or more PUCCH repetitions on adjusted resources, such as an adjusted number of repetitions or an adjusted number of slots within each repetition. Adjustable resources may provide the device 1405 with more efficient utilization of communication resources. Further, increasing a number of repetitions may improve communication reliability for the device 1405.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of multi-level time-domain scalable uplink channel resources as described herein, or the processor 1440 and the memory 1430 may be otherwise configured to perform or support such operations.

Figure 15:
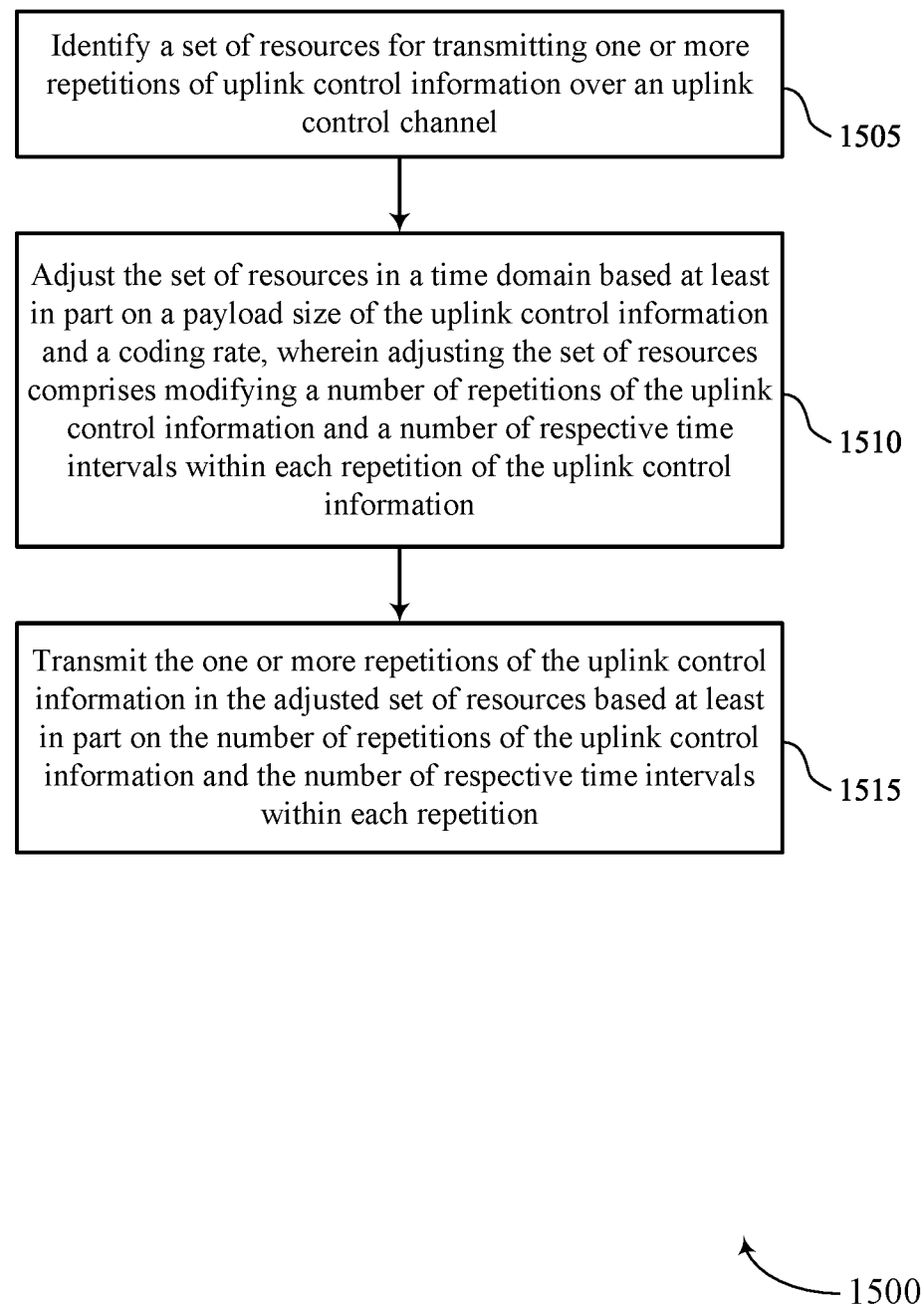
FIGS. 15 through 20 show flowcharts illustrating methods that support multi-level time-domain scalable uplink channel resources in accordance with aspects of the present disclosure.

FIG. 15 shows a flowchart illustrating a method 1500 that supports multi-level time-domain scalable uplink channel resources in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include identifying a set of resources for transmitting one or more repetitions of uplink control information over an uplink control channel. The operations of 1505 may be performed in accordance with examples as disclosed herein. In some examples, aspects of the operations of 1505 may be performed by a resource manager 925 as described with reference to FIG. 9.

At 1510, the method may include adjusting the set of resources in a time domain based on a payload size of the uplink control information and a coding rate, where adjusting the set of resources includes modifying a number of repetitions of the uplink control information and a number of respective time intervals within each repetition of the uplink control information. The operations of 1510 may be performed in accordance with examples as disclosed herein. In some examples, aspects of the operations of 1510 may be performed by a time-domain adjustment component 930 as described with reference to FIG. 9.

At 1515, the method may include transmitting the one or more repetitions of the uplink control information in the adjusted set of resources based on the number of repetitions of the uplink control information and the number of respective time intervals within each repetition. The operations of 1515 may be performed in accordance with examples as disclosed herein. In some examples, aspects of the operations of 1515 may be performed by a repetition manager 935 as described with reference to FIG. 9.

Figure 16:
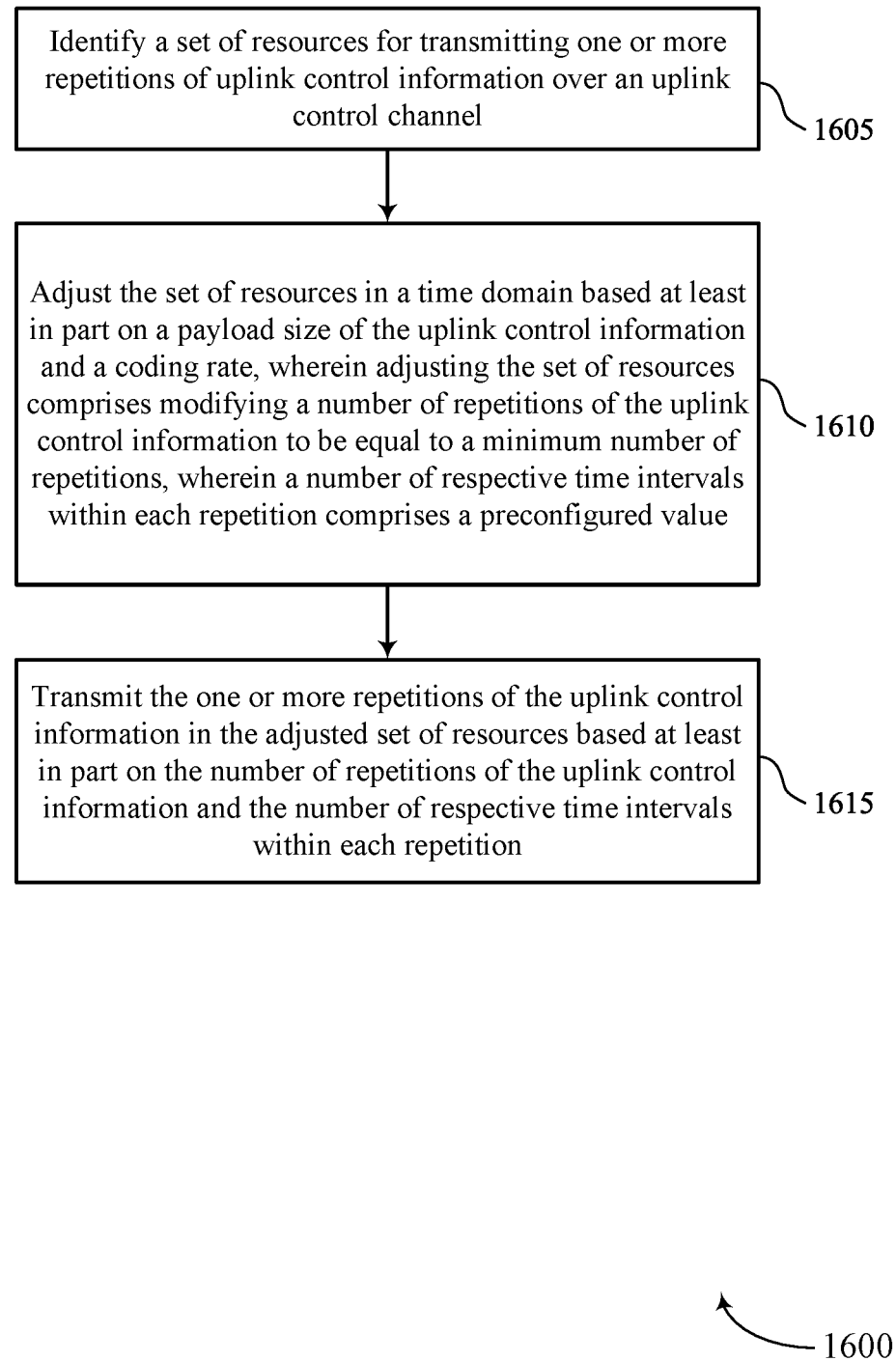

FIG. 16 shows a flowchart illustrating a method 1600 that supports multi-level time-domain scalable uplink channel resources in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include identifying a set of resources for transmitting one or more repetitions of uplink control information over an uplink control channel. The operations of 1605 may be performed in accordance with examples as disclosed herein. In some examples, aspects of the operations of 1605 may be performed by a resource manager 925 as described with reference to FIG. 9.

At 1610, the method may include adjusting the set of resources in a time domain based on a payload size of the uplink control information and a coding rate, where adjusting the set of resources includes modifying a number of repetitions of the uplink control information and a number of respective time intervals within each repetition of the uplink control information. In some examples, adjusting the set of resources may include modifying the number of repetitions of the uplink control information to be equal to a minimum number of repetitions, where the number of respective time intervals within each repetition includes a preconfigured value. The operations of 1610 may be performed in accordance with examples as disclosed herein. In some examples, aspects of the operations of 1610 may be performed by a time-domain adjustment component 930 as described with reference to FIG. 9.

At 1615, the method may include transmitting the one or more repetitions of the uplink control information in the adjusted set of resources based on the number of repetitions of the uplink control information and the number of respective time intervals within each repetition. The operations of 1615 may be performed in accordance with examples as disclosed herein. In some examples, aspects of the operations of 1615 may be performed by a repetition manager 935 as described with reference to FIG. 9.

Figure 17:
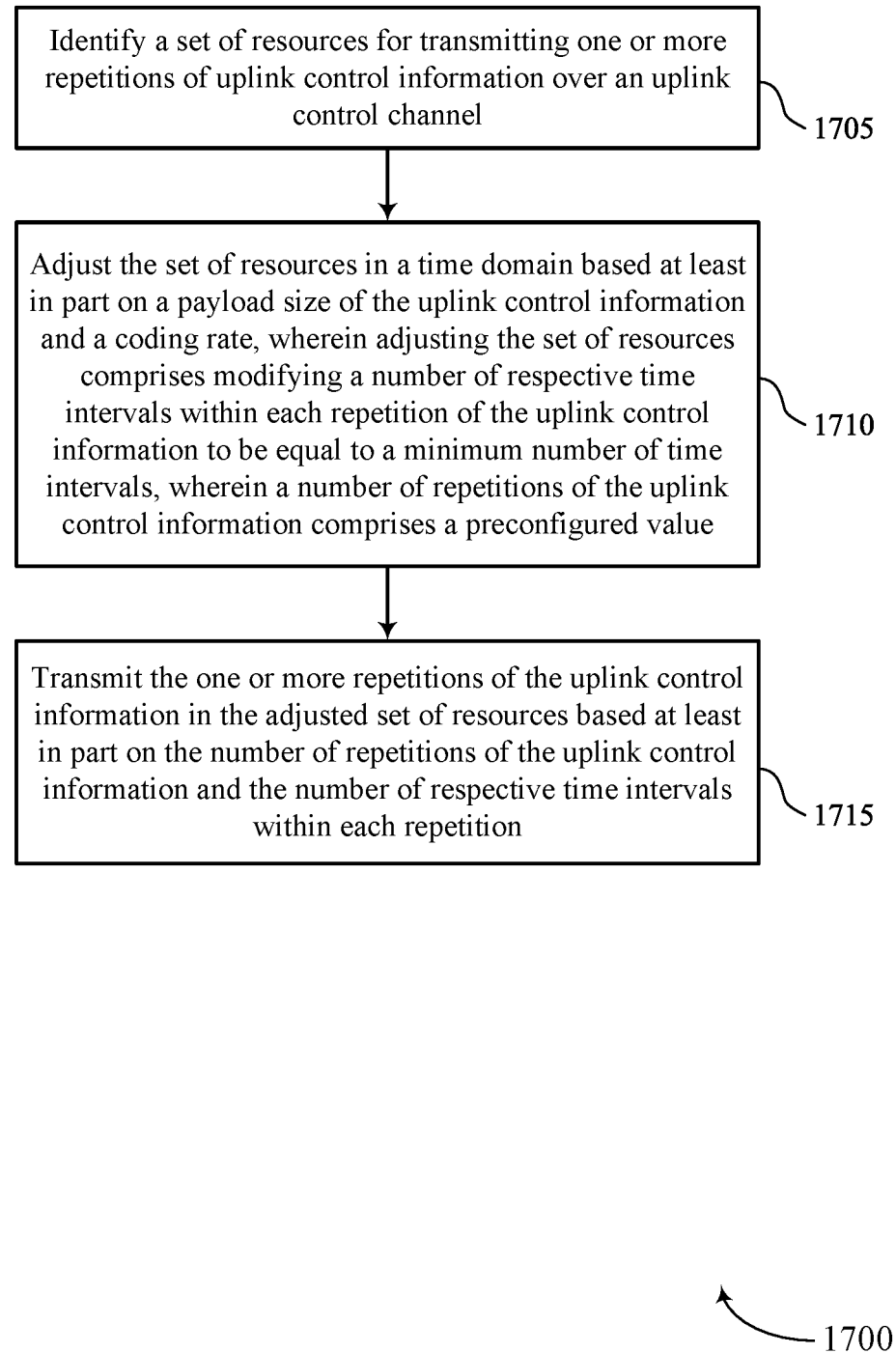

FIG. 17 shows a flowchart illustrating a method 1700 that supports multi-level time-domain scalable uplink channel resources in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include identifying a set of resources for transmitting one or more repetitions of uplink control information over an uplink control channel. The operations of 1705 may be performed in accordance with examples as disclosed herein. In some examples, aspects of the operations of 1705 may be performed by a resource manager 925 as described with reference to FIG. 9.

At 1710, the method may include adjusting the set of resources in a time domain based on a payload size of the uplink control information and a coding rate, where adjusting the set of resources includes modifying a number of repetitions of the uplink control information and a number of respective time intervals within each repetition of the uplink control information. In some examples, adjusting the set of resources may include modifying the number of respective time intervals within each repetition to be equal to a minimum number of time intervals, where the number of repetitions of the uplink control information includes a preconfigured value. The operations of 1710 may be performed in accordance with examples as disclosed herein. In some examples, aspects of the operations of 1710 may be performed by a time-domain adjustment component 930 as described with reference to FIG. 9.

At 1715, the method may include transmitting the one or more repetitions of the uplink control information in the adjusted set of resources based on the number of repetitions of the uplink control information and the number of respective time intervals within each repetition. The operations of 1715 may be performed in accordance with examples as disclosed herein. In some examples, aspects of the operations of 1715 may be performed by a repetition manager 935 as described with reference to FIG. 9.

Figure 18:
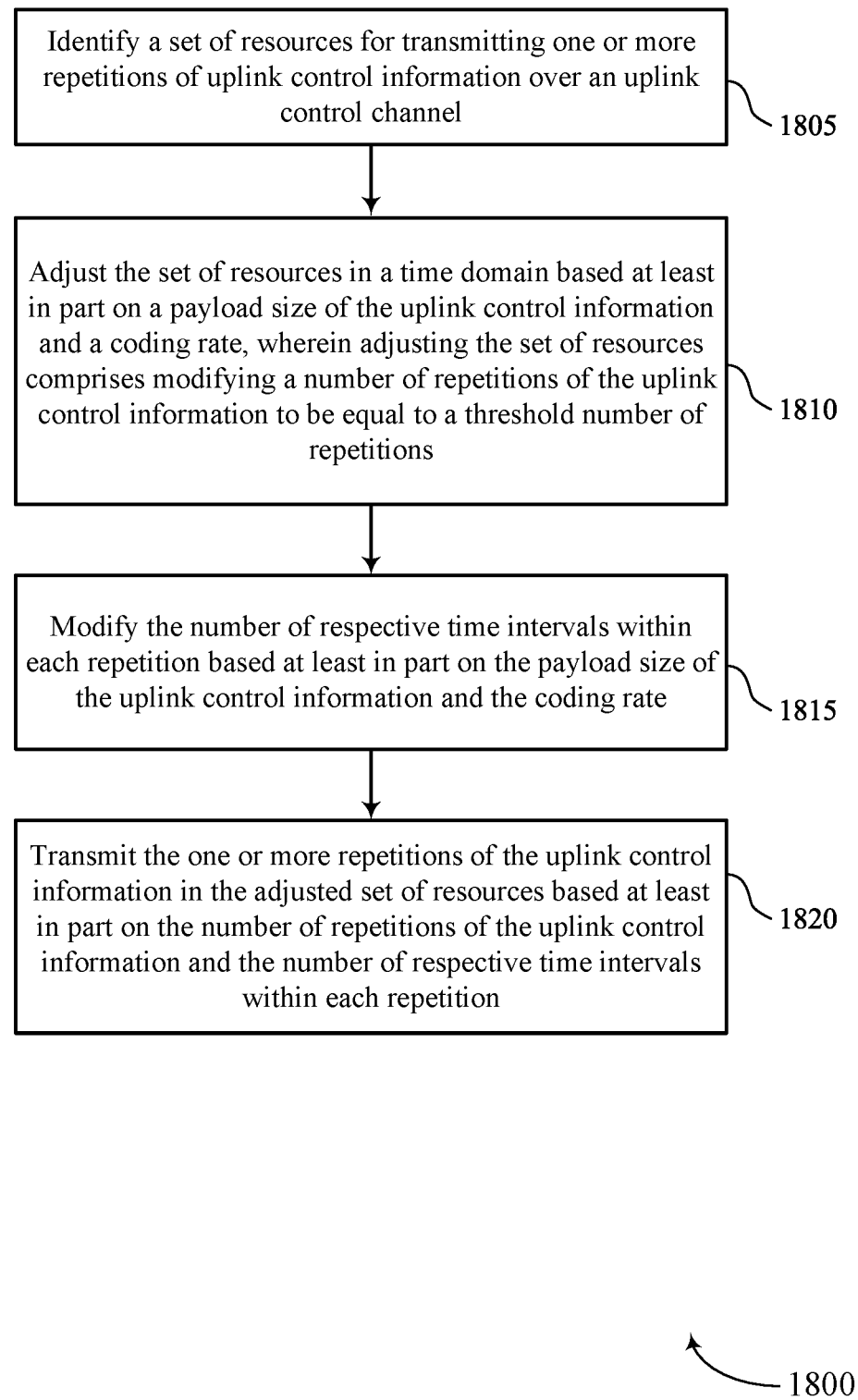

FIG. 18 shows a flowchart illustrating a method 1800 that supports multi-level time-domain scalable uplink channel resources in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include identifying a set of resources for transmitting one or more repetitions of uplink control information over an uplink control channel. The operations of 1805 may be performed in accordance with examples as disclosed herein. In some examples, aspects of the operations of 1805 may be performed by a resource manager 925 as described with reference to FIG. 9.

At 1810, the method may include adjusting the set of resources in a time domain based on a payload size of the uplink control information and a coding rate, where adjusting the set of resources includes modifying a number of repetitions of the uplink control information and a number of respective time intervals within each repetition of the uplink control information. In some examples, adjusting the set of resources may include modifying the number of repetitions of the uplink control information to be equal to a threshold number of repetitions. The operations of 1810 may be performed in accordance with examples as disclosed herein. In some examples, aspects of the operations of 1810 may be performed by a time-domain adjustment component 930 as described with reference to FIG. 9.

At 1815, the method may include modifying the number of respective time intervals within each repetition based on the payload size of the uplink control information and the coding rate. The operations of 1815 may be performed in accordance with examples as disclosed herein. In some examples, aspects of the operations of 1815 may be performed by a time-domain adjustment component 930 as described with reference to FIG. 9.

At 1820, the method may include transmitting the one or more repetitions of the uplink control information in the adjusted set of resources based on the number of repetitions of the uplink control information and the number of respective time intervals within each repetition. The operations of 1820 may be performed in accordance with examples as disclosed herein. In some examples, aspects of the operations of 1820 may be performed by a repetition manager 935 as described with reference to FIG. 9.

Figure 19:
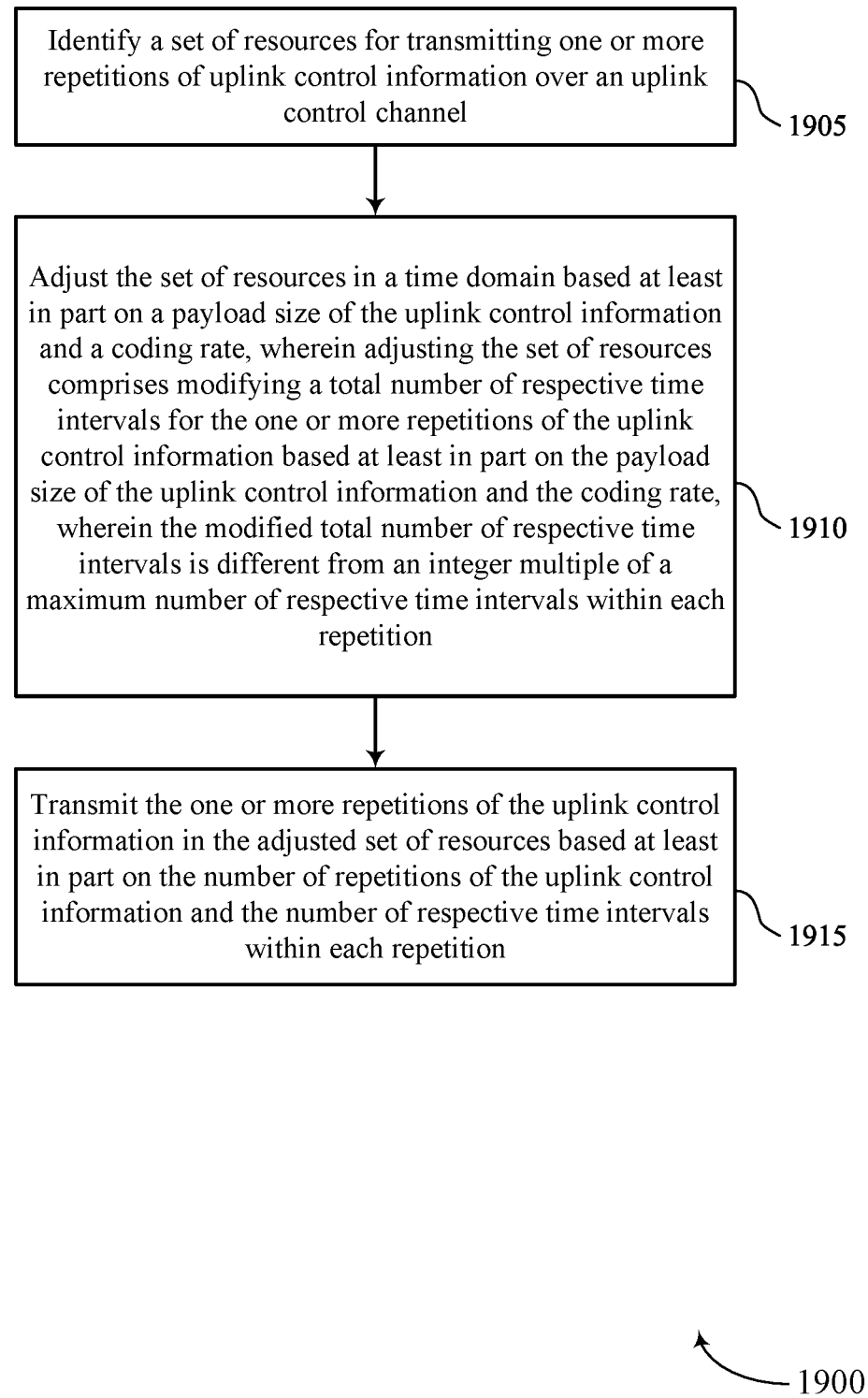

FIG. 19 shows a flowchart illustrating a method 1900 that supports multi-level time-domain scalable uplink channel resources in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1905, the method may include identifying a set of resources for transmitting one or more repetitions of uplink control information over an uplink control channel. The operations of 1905 may be performed in accordance with examples as disclosed herein. In some examples, aspects of the operations of 1905 may be performed by a resource manager 925 as described with reference to FIG. 9.

At 1910, the method may include adjusting the set of resources in a time domain based on a payload size of the uplink control information and a coding rate, where adjusting the set of resources includes modifying a number of repetitions of the uplink control information and a number of respective time intervals within each repetition of the uplink control information. In some examples, adjusting the set of resources may include modifying a total number of respective time intervals for the one or more repetitions of the uplink control information based on the payload size of the uplink control information and the coding rate, where the modified total number of respective time intervals is different from an integer multiple of a maximum number of respective time intervals within each repetition. The operations of 1910 may be performed in accordance with examples as disclosed herein. In some examples, aspects of the operations of 1910 may be performed by a time-domain adjustment component 930 as described with reference to FIG. 9.

At 1915, the method may include transmitting the one or more repetitions of the uplink control information in the adjusted set of resources based on the number of repetitions of the uplink control information and the number of respective time intervals within each repetition. The operations of 1915 may be performed in accordance with examples as disclosed herein. In some examples, aspects of the operations of 1915 may be performed by a repetition manager 935 as described with reference to FIG. 9.

Figure 20:
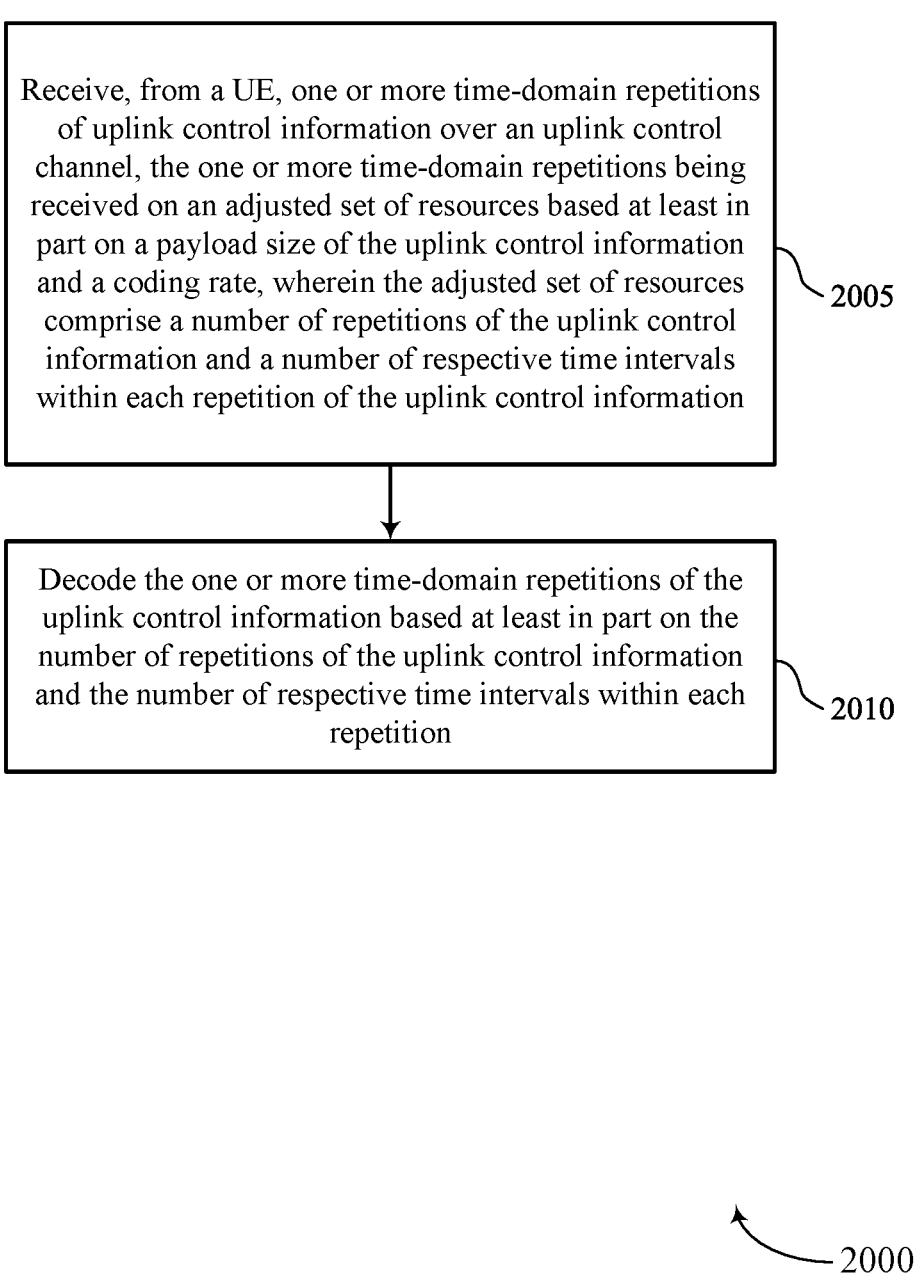

FIG. 20 shows a flowchart illustrating a method 2000 that supports multi-level time-domain scalable uplink channel resources in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include receiving, from a UE, one or more time-domain repetitions of uplink control information over an uplink control channel, the one or more time-domain repetitions being received on an adjusted set of resources based on a payload size of the uplink control information and a coding rate, where the adjusted set of resources include a number of repetitions of the uplink control information and a number of respective time intervals within each repetition of the uplink control information. The operations of 2005 may be performed in accordance with examples as disclosed herein. In some examples, aspects of the operations of 2005 may be performed by a control information manager 1325 as described with reference to FIG. 13.

At 2010, the method may include decoding the one or more time-domain repetitions of the uplink control information based on the number of repetitions of the uplink control information and the number of respective time intervals within each repetition. The operations of 2010 may be performed in accordance with examples as disclosed herein. In some examples, aspects of the operations of 2010 may be performed by a decoder 1330 as described with reference to FIG. 13.

The following provides an overview of aspects of the present disclosure:

Aspect 1: A method for wireless communication at a UE, comprising: identifying a set of resources for transmitting one or more repetitions of uplink control information over an uplink control channel; adjusting the set of resources in a time domain based at least in part on a payload size of the uplink control information and a coding rate, wherein adjusting the set of resources comprises modifying a number of repetitions of the uplink control information and a number of respective time intervals within each repetition of the uplink control information; and transmitting the one or more repetitions of the uplink control information in the adjusted set of resources based at least in part on the number of repetitions of the uplink control information and the number of respective time intervals within each repetition.

Aspect 2: The method of aspect 1, wherein adjusting the set of resources comprises: modifying the number of repetitions of the uplink control information to be equal to a minimum number of repetitions, wherein the number of respective time intervals within each repetition comprises a preconfigured value.

Aspect 3: The method of aspect 1, wherein adjusting the set of resources comprises: modifying the number of respective time intervals within each repetition to be equal to a minimum number of time intervals, wherein the number of repetitions of the uplink control information comprises a preconfigured value.

Aspect 4: The method of aspect 1, wherein adjusting the set of resources comprises: modifying the number of repetitions of the uplink control information to be equal to a threshold number of repetitions; and modifying the number of respective time intervals within each repetition based at least in part on the payload size of the uplink control information and the coding rate.

Aspect 5: The method of aspect 4, wherein the threshold number of repetitions comprises one repetition.

Aspect 6: The method of aspect 1, wherein adjusting the set of resources comprises: modifying a total number of respective time intervals for the one or more repetitions of the uplink control information based at least in part on the payload size of the uplink control information and the coding rate, wherein the modified total number of respective time intervals is different from an integer multiple of a maximum number of respective time intervals within each repetition.

Aspect 7: The method of any of aspects 1 through 6, further comprising: mapping encoded bits of the uplink control information to resource elements of the adjusted set of resources, wherein the encoded bits are continuously mapped over the respective time intervals within each repetition of the uplink control information.

Aspect 8: The method of any of aspects 1 through 7, further comprising: identifying a fixed number of physical resource blocks corresponding to the set of resources, wherein the fixed number of physical resource blocks are preconfigured, configured via radio resource control signaling, or both.

Aspect 9: The method of any of aspects 1 through 8, further comprising: determining to exclude a portion of channel state information from the one or more repetitions of the uplink control information based at least in part on the payload size of the uplink control information, wherein excluding the portion of the channel state information is based at least in part on a number of time intervals configured for the one or more repetitions of the uplink control information.

Aspect 10: The method of aspect 9, wherein the number of time intervals configured for the one or more repetitions comprises a product of a maximum number of repetitions of the uplink control information and a maximum number of respective time intervals within each repetition.

Aspect 11: The method of any of aspects 1 through 10, further comprising: adjusting the set of resources in a frequency domain based at least in part on the payload size of the uplink control information and the coding rate, wherein adjusting the set of resources in the frequency domain comprises modifying a number of physical resource blocks based at least in part on a format of the uplink control channel.

Aspect 12: The method of aspect 11, wherein the set of resources are adjusted in the frequency domain prior to adjusting the set of resources in the time domain.

Aspect 13: The method of any of aspects 11 through 12, wherein the set of resources are adjusted in the frequency domain after adjusting the set of resources in the time domain.

Aspect 14: The method of any of aspects 1 through 13, further comprising: determining a minimum number of repetitions of the uplink control information based at least in part on a rank value equal to one, wherein a payload size of channel state information is determined based at least in part on the rank value.

Aspect 15: The method of any of aspects 1 through 14, further comprising: determining a minimum number of time intervals within each repetition of the uplink control information based at least in part on a rank value equal to one, wherein a payload size of channel state information is determined based at least in part on the rank value.

Aspect 16: The method of any of aspects 1 through 15, further comprising: determining a first repetition configuration of a maximum number of repetitions of the uplink control information and a second repetition configuration of a maximum number of respective time intervals within each repetition of the uplink control information, wherein modifying the number of repetitions of the uplink control information and the number of respective time intervals within each repetition of the uplink control information is based at least in part on the first repetition configuration and the second repetition configuration.

Aspect 17: The method of aspect 16, wherein the first repetition configuration and the second repetition configuration are configured per uplink control channel resource, per uplink control channel format, or any combination thereof.

Aspect 18: The method of any of aspects 1 through 17, wherein the respective time intervals within each repetition comprises a slot.

Aspect 19: A method for wireless communication at a base station, comprising: receiving, from a UE, one or more time-domain repetitions of uplink control information over an uplink control channel, the one or more time-domain repetitions being received on an adjusted set of resources based at least in part on a payload size of the uplink control information and a coding rate, wherein the adjusted set of resources comprise a number of repetitions of the uplink control information and a number of respective time intervals within each repetition of the uplink control information; and decoding the one or more time-domain repetitions of the uplink control information based at least in part on the number of repetitions of the uplink control information and the number of respective time intervals within each repetition.

Aspect 20: The method of aspect 19, wherein receiving the one or more time-domain repetitions of the uplink control information comprises: receiving the one or more time-domain repetitions of the uplink control information in a minimum number of repetitions of the uplink control information, wherein the number of respective time intervals within each repetition comprises a preconfigured value.

Aspect 21: The method of aspect 19, wherein receiving the one or more time-domain repetitions of the uplink control information comprises: receiving the one or more time-domain repetitions of the uplink control information in a minimum number of respective time intervals within each repetition of the uplink control information, wherein the number of repetitions of the uplink control information comprises a preconfigured value.

Aspect 22: The method of aspect 19, wherein receiving the one or more time-domain repetitions of the uplink control information comprises: receiving the one or more time-domain repetitions of the uplink control information in a threshold number of repetitions of the uplink control information and in a minimum number of respective time intervals within each repetition based at least in part on the payload size of the uplink control information and the coding rate.

Aspect 23: The method of aspect 22, wherein the threshold number of repetitions of the uplink control information comprises one repetition.

Aspect 24: The method of aspect 19, wherein receiving the one or more time-domain repetitions of the uplink control information comprises: receiving the one or more time-domain repetitions of the uplink control information in a modified number of respective time intervals, wherein the modified number of repetitions of the uplink control information is different from an integer multiple of a maximum number of respective time intervals within each repetition.

Aspect 25: The method of any of aspects 19 through 24, wherein decoding the one or more time-domain repetitions of the uplink control information comprises: decoding the one or more time-domain repetitions of the uplink control information based at least in part on encoded bits that are continuously mapped over the respective time intervals within each repetition of the uplink control information.

Aspect 26: The method of any of aspects 19 through 25, further comprising: determining a payload size of channel state information included in the uplink control information, wherein the payload size of the channel state information is based at least in part on a rank value equal to one.

Aspect 27: The method of any of aspects 19 through 26, wherein receiving the one or more time-domain repetitions of the uplink control information comprises: receiving the one or more time-domain repetitions of the uplink control information in an adjusted set of frequency-domain resources based at least in part on the payload size of the uplink control information and the coding rate.

Aspect 28: The method of any of aspects 19 through 27, further comprising: configuring a maximum number of repetitions of the uplink control information; and configuring a maximum number of respective time intervals within each repetition of the uplink control information, the number of repetitions of the uplink control information and the number of respective time intervals within each repetition of the uplink control information is based at least in part on the configurations.

Aspect 29: An apparatus for wireless communication at a UE, comprising a processor; memory coupled with the processor; and instructions stored in the memory and executable by the processor to cause the apparatus to perform a method of any of aspects 1 through 18.

Aspect 30: An apparatus for wireless communication at a UE, comprising at least one means for performing a method of any of aspects 1 through 18.

Aspect 31: A non-transitory computer-readable medium storing code for wireless communication at a UE, the code comprising instructions executable by a processor to perform a method of any of aspects 1 through 18.

Aspect 32: An apparatus for wireless communication at a base station, comprising a processor; memory coupled with the processor; and instructions stored in the memory and executable by the processor to cause the apparatus to perform a method of any of aspects 19 through 28.

Aspect 33: An apparatus for wireless communication at a base station, comprising at least one means for performing a method of any of aspects 19 through 28.

Aspect 34: A non-transitory computer-readable medium storing code for wireless communication at a base station, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   identifying a set of resources for transmitting one or more repetitions of uplink control information over an uplink control channel;
   adjusting the set of resources in a time domain based at least in part on a payload size of the uplink control information and a coding rate, wherein adjusting the set of resources comprises modifying a number of repetitions of the uplink control information and a number of respective time intervals within each repetition of the uplink control information; and
   transmitting the one or more repetitions of the uplink control information in the adjusted set of resources based at least in part on the number of repetitions of the uplink control information and the number of respective time intervals within each repetition.

2. The method of claim 1, wherein adjusting the set of resources comprises:
   modifying the number of repetitions of the uplink control information to be equal to a minimum number of repetitions, wherein the number of respective time intervals within each repetition comprises a preconfigured value.

3. The method of claim 1, wherein adjusting the set of resources comprises:
   modifying the number of respective time intervals within each repetition to be equal to a minimum number of time intervals, wherein the number of repetitions of the uplink control information comprises a preconfigured value.

4. The method of claim 1, wherein adjusting the set of resources comprises:
   modifying the number of repetitions of the uplink control information to be equal to a threshold number of repetitions; and
   modifying the number of respective time intervals within each repetition based at least in part on the payload size of the uplink control information and the coding rate.

5. The method of claim 4, wherein the threshold number of repetitions comprises one repetition.

6. The method of claim 1, wherein adjusting the set of resources comprises:
   modifying a total number of respective time intervals for the one or more repetitions of the uplink control information based at least in part on the payload size of the uplink control information and the coding rate, wherein the modified total number of respective time intervals is different from an integer multiple of a maximum number of respective time intervals within each repetition.

7. The method of claim 1, further comprising:
   mapping encoded bits of the uplink control information to resource elements of the adjusted set of resources, wherein the encoded bits are continuously mapped over the respective time intervals within each repetition of the uplink control information.

8. The method of claim 1, further comprising:
   identifying a fixed number of physical resource blocks corresponding to the set of resources, wherein the fixed number of physical resource blocks are preconfigured, configured via radio resource control signaling, or both.

9. The method of claim 1, further comprising:
   determining to exclude a portion of channel state information from the one or more repetitions of the uplink control information based at least in part on the payload size of the uplink control information, wherein excluding the portion of the channel state information is based at least in part on a number of time intervals configured for the one or more repetitions of the uplink control information.

10. The method of claim 9, wherein the number of time intervals configured for the one or more repetitions comprises a product of a maximum number of repetitions of the uplink control information and a maximum number of respective time intervals within each repetition.

11. The method of claim 1, further comprising:
    adjusting the set of resources in a frequency domain based at least in part on the payload size of the uplink control information and the coding rate, wherein adjusting the set of resources in the frequency domain comprises modifying a number of physical resource blocks based at least in part on a format of the uplink control channel.

12. The method of claim 11, wherein the set of resources are adjusted in the frequency domain prior to adjusting the set of resources in the time domain.

13. The method of claim 11, wherein the set of resources are adjusted in the frequency domain after adjusting the set of resources in the time domain.

14. The method of claim 1, further comprising:
    determining a minimum number of repetitions of the uplink control information based at least in part on a rank value equal to one, wherein a payload size of channel state information is determined based at least in part on the rank value.

15. The method of claim 1, further comprising:
    determining a minimum number of time intervals within each repetition of the uplink control information based at least in part on a rank value equal to one, wherein a payload size of channel state information is determined based at least in part on the rank value.

16. The method of claim 1, further comprising:
    determining a first repetition configuration of a maximum number of repetitions of the uplink control information and a second repetition configuration of a maximum number of respective time intervals within each repetition of the uplink control information, wherein modifying the number of repetitions of the uplink control information and the number of respective time intervals within each repetition of the uplink control information is based at least in part on the first repetition configuration and the second repetition configuration.

17. The method of claim 16, wherein the first repetition configuration and the second repetition configuration are configured per uplink control channel resource, per uplink control channel format, or any combination thereof.

18. The method of claim 1, wherein the respective time intervals within each repetition comprises a slot.

19. A method for wireless communication at a base station, comprising:
    receiving, from a user equipment (UE), one or more time-domain repetitions of uplink control information over an uplink control channel, the one or more time-domain repetitions being received on an adjusted set of resources based at least in part on a payload size of the uplink control information and a coding rate, wherein the adjusted set of resources comprise a number of repetitions of the uplink control information and a number of respective time intervals within each repetition of the uplink control information; and decoding the one or more time-domain repetitions of the uplink control information based at least in part on the number of repetitions of the uplink control information and the number of respective time intervals within each repetition.

20. The method of claim 19, wherein receiving the one or more time-domain repetitions of the uplink control information comprises:

receiving the one or more time-domain repetitions of the uplink control information in a minimum number of repetitions of the uplink control information, wherein the number of respective time intervals within each repetition comprises a preconfigured value.

21. The method of claim 19, wherein receiving the one or more time-domain repetitions of the uplink control information comprises:

receiving the one or more time-domain repetitions of the uplink control information in a minimum number of respective time intervals within each repetition of the uplink control information, wherein the number of repetitions of the uplink control information comprises a preconfigured value.

22. The method of claim 19, wherein receiving the one or more time-domain repetitions of the uplink control information comprises:

receiving the one or more time-domain repetitions of the uplink control information in a threshold number of repetitions of the uplink control information and in a minimum number of respective time intervals within each repetition based at least in part on the payload size of the uplink control information and the coding rate.

23. The method of claim 22, wherein the threshold number of repetitions of the uplink control information comprises one repetition.

24. The method of claim 19, wherein receiving the one or more time-domain repetitions of the uplink control information comprises:

receiving the one or more time-domain repetitions of the uplink control information in a modified number of respective time intervals, wherein the modified number of repetitions of the uplink control information is different from an integer multiple of a maximum number of respective time intervals within each repetition.

25. The method of claim 19, wherein decoding the one or more time-domain repetitions of the uplink control information comprises:

decoding the one or more time-domain repetitions of the uplink control information based at least in part on encoded bits that are continuously mapped over the respective time intervals within each repetition of the uplink control information.

26. The method of claim 19, further comprising:

determining a payload size of channel state information included in the uplink control information, wherein the payload size of the channel state information is based at least in part on a rank value equal to one.

27. The method of claim 19, wherein receiving the one or more time-domain repetitions of the uplink control information comprises:

receiving the one or more time-domain repetitions of the uplink control information in an adjusted set of frequency-domain resources based at least in part on the payload size of the uplink control information and the coding rate.

28. The method of claim 19, further comprising:

configuring a maximum number of repetitions of the uplink control information; and configuring a maximum number of respective time intervals within each repetition of the uplink control information, the number of repetitions of the uplink control information and the number of respective time intervals within each repetition of the uplink control information is based at least in part on the configurations.

29. An apparatus for wireless communication at a user equipment (UE), comprising:

means for identifying a set of resources for transmitting one or more repetitions of uplink control information over an uplink control channel;

means for adjusting the set of resources in a time domain based at least in part on a payload size of the uplink control information and a coding rate, wherein adjusting the set of resources comprises modifying a number of repetitions of the uplink control information and a number of respective time intervals within each repetition of the uplink control information; and means for transmitting the one or more repetitions of the uplink control information in the adjusted set of resources based at least in part on the number of repetitions of the uplink control information and the number of respective time intervals within each repetition.

30. An apparatus for wireless communication at a base station, comprising:

means for receiving, from a user equipment (UE), one or more time-domain repetitions of uplink control information over an uplink control channel, the one or more time-domain repetitions being received on an adjusted set of resources based at least in part on a payload size of the uplink control information and a coding rate, wherein the adjusted set of resources comprise a number of repetitions of the uplink control information and a number of respective time intervals within each repetition of the uplink control information; and means for decoding the one or more time-domain repetitions of the uplink control information based at least in part on the number of repetitions of the uplink control information and the number of respective time intervals within each repetition.

* * * * *